(12) United States Patent
Furment et al.

(10) Patent No.: US 9,349,414 B1
(45) Date of Patent: May 24, 2016

(54) SYSTEM AND METHOD FOR SIMULTANEOUS CAPTURE OF TWO VIDEO STREAMS

(71) Applicants: Odile Aimee Furment, New York, NY (US); Isaac Segall, New York, NY (US)

(72) Inventors: Odile Aimee Furment, New York, NY (US); Isaac Segall, New York, NY (US)

( * ) Notice: Subject to any disclaimer, the term of this patent is extended or adjusted under 35 U.S.C. 154(b) by 0 days.

(21) Appl. No.: 14/858,988

(22) Filed: Sep. 18, 2015

(51) Int. Cl.
| | |
|---|---|
| *G11B 27/00* | (2006.01) |
| *H04N 5/93* | (2006.01) |
| *H04N 5/89* | (2006.01) |
| *G11B 27/036* | (2006.01) |
| *H04N 9/87* | (2006.01) |
| *G06T 13/40* | (2011.01) |
| *G11B 31/00* | (2006.01) |
| *H04N 5/232* | (2006.01) |
| *G11B 27/10* | (2006.01) |
| *H04L 12/58* | (2006.01) |
| *H04N 9/80* | (2006.01) |

(52) U.S. Cl.
CPC .............. *G11B 27/036* (2013.01); *G06T 13/40* (2013.01); *G11B 27/10* (2013.01); *G11B 31/006* (2013.01); *H04L 51/32* (2013.01); *H04N 5/23216* (2013.01); *H04N 5/23293* (2013.01); *H04N 9/8715* (2013.01)

(58) Field of Classification Search
USPC .......... 386/278, 280, 282, 286, 287, 326, 353, 386/239
See application file for complete search history.

(56) References Cited

U.S. PATENT DOCUMENTS

| 5,623,587 A | * | 4/1997 | Bulman | .................. G06T 13/80 345/630 |
|---|---|---|---|---|
| 2009/0169168 A1 | * | 7/2009 | Ishikawa | ........... G06F 17/30017 386/278 |
| 2010/0061695 A1 | * | 3/2010 | Furmanski | ........... G11B 27/034 386/278 |
| 2012/0120186 A1 | * | 5/2012 | Diaz | .................... H04N 5/2258 348/36 |
| 2013/0120602 A1 | * | 5/2013 | Huang | .............. H04M 1/72522 348/218.1 |
| 2013/0194428 A1 | * | 8/2013 | Chao | ...................... G01C 21/20 348/159 |
| 2016/0071491 A1 | * | 3/2016 | Berryman | ................ G09G 5/14 345/173 |

* cited by examiner

*Primary Examiner* — Daquan Zhao
(74) *Attorney, Agent, or Firm* — Seth Natter; Natter & Natter

(57) ABSTRACT

A method and process for video recording on a mobile device that simultaneously records, syncs, and combines two captured video streams into one resulting video recording enabling a user to video record an event, be visually immersed in the event as an active participant, and share their narrated recorded experience in a social media network. The application method and process utilizes an image sensor to provide for continuous auto-face-detection and auto-focus with first camera for capture and record of user's face-only video overlaid on user's simultaneous capture and recording of the event with second camera. The disclosure further illustrates application functionality to create new content and re-involve user in pre-captured videos by enabling a user to simultaneously record a face-only video narrative overlaid on playback of a pre-recorded video, and further enables customization option for combining a user face-only video recorded narrative with a user selected avatar body overlaid on user video recorded event and uploaded to the social media network.

10 Claims, 23 Drawing Sheets

US 9,349,414 B1

SYSTEM AND METHOD FOR SIMULTANEOUS CAPTURE OF TWO VIDEO STREAMS

TECHNICAL FIELD OF THE INVENTION

The present disclosure generally relates to computer based method and process for social media networking, and, more particularly to mobile software applications that: allow users to simultaneously capture, record, sync and combine two video streams on a mobile device, synthesizing the first video stream recording and the second video stream recording and previewing the synthesized result as one video recording. The application method and process provides for continuous auto-face-detection and auto-focus in capturing and recording a first stream of user's face-only video narrative of an event overlaid on user's simultaneous second stream recording of the same event. Users are further able to simultaneously capture, record, sync, and combine user's face-only video narrative recording overlaid on playback of pre-recorded video and photos. Synthesizing two streams simultaneously to create the resulting video recording forms the basis for user engagement and interaction in the social media network.

BACKGROUND

Almost every second of every day, worldwide, thousands of people utilize smart-phones to video record life's most memorable moments. By posting and sharing videos and photos to social media networks, user's present their life experiences to friends, family, and the world. Unfortunately, the user typically video recording the event with a Smart-phone camera is either notably absent in the recorded event, or is resigned to recording the event, and his or her participation in the event, by utilizing either a selfie stick, or an arm's length limited perspective approach. As Smartphones have become unquestioningly the predominant recording device of choice worldwide, users find themselves possessing volumes of videos that simply languish without their visual and vocal narrated presence. The consumer demand for a method and process enabling a user to be a vocal and visible participant in a recorded event, while recording the event, and readily share their narrated experience of the event in a social media network, is greater now than ever.

Video-based networking applications and websites, occasionally referred to as image-based social media networking websites, offer users a platform for sharing and posting videos and photos but have not provided and or enabled application software permitting a user to be involved and interact in every event he or she records and ultimately shares. Existing social media applications limit the user's expressions in sharing videos to post-recording editing, comprised of; adding text, selection of filters, animated video templates, and basic editing tools. Social media applications currently do not offer user options for video recording an event and simultaneously video recording his or her expressions and reactions in participating in the event. Social media network applications lack simultaneous two stream recording integration, and as a result preclude users from recording an event and concurrently presenting their visible and vocal narrative of the event. Enabling real-time video capture of an event and simultaneous real-time capture of user expressions and reactions to the event provide the user a unique immersive experience readily shared to social media.

Furthermore, while some social media applications utilize a mobile device's first and second video cameras, with the ability to capture and record two video streams, none of these social media applications offer integrated application systems that simultaneously capture, sync, and combine two video streams into one resulting video recording enabling user to capture and record an event while simultaneously capturing and recording their visible and vocal presence in the event. Existing social media applications lack continuous auto-face detection and auto-focus functionality in capturing and recording user's face-only video, in an oval frame display, simultaneously overlaid on user recording of an event. Further limiting user creativity, social media applications lack integrated functionalities enabling a user to create new content by overlaying a face-only video narrative recording simultaneously overlaid on playback of their pre-recorded videos. Additionally, existing social media applications do not offer an option for placement of a user face-only video narrative recording of an event, in an oval frame, above a user selected three dimensional avatar body with movement simultaneously overlaid on the user recording of an event.

Hence, what is needed in a mobile device based method of providing an image and video-based social media networking application is an integrated method and process enabling the user to simultaneously record, sync, and combine two video streams, into one resulting video recording, enabling a user to video record an event, be visually be immersed in the event as an active participant, and share the narrated experience in a social media network. Whereby the application system enables the front-end camera's continuous auto-face-detection and auto-focus to capture and record user's face-only video narrative of an event in an oval frame overlaid on user's simultaneous recording of the event with the back-end camera. Further functionality enabling a user to simultaneously record a face-only video narrative in an oval frame overlaid on playback of a pre-recorded video event enables user to be immersed as a visual and vocal participant in any video and create new video content. Creatively combining an animated avatar body beneath user's face-only video narrative recording overlaid on user's simultaneous recording of an event further enables user to personalize and share their experience in the social media network.

SUMMARY

According to the embodiments of the present disclosure, the foregoing discloses a new and interactive mobile computer device-based method and process for video and image-based social media networking, whereby the application processes a mobile device's image sensor data to execute logical instructions for continual auto-face-detection and auto-focus for capture and recording of user face-only video utilizing front-end camera, simultaneously overlaid on user recording of back-end event utilizing back-end camera. The embodiments herein allow the user three distinct ways to capture, record, sync, and combine two video streams simultaneously on a mobile device, synthesizing first video stream and the second video stream, and viewing the synthesized result as one video recording. User has option to simultaneously record two video streams comprised of front-end camera capture of user face-only and back-end camera capture of event. Alternatively user has option to select a pre-recorded video file from application's video gallery and to initiate simultaneous capture of two video streams comprised of front-end camera face-only recording overlaid on playback of pre-recorded event. Further, user has option to first capture and record back-end event only with back-end camera and upon completion user can immediately commence simultaneous recording of two video streams comprised of face-only video utilizing front-end camera simultaneously overlaid on playback of back-end event.

According to an embodiment of the method and process, allowing user to simultaneously video capture and record two video streams with further options for face-only recording in oval frame size-ability and move-ability functionality, while simultaneously overlaid on back-end recording.

According to an embodiment of the method and process, allowing user to record two video streams with further user options for previewing completed recording hereafter referred to as Feature, deleting Feature, and save and proceed Feature.

According to an embodiment of the method and process, allowing user to alter and edit Feature with user options for selecting an avatar body for inclusion with Feature.

According to an embodiment of the method and process, providing user options for uploading said Feature within the social media network application, to all users in the social media application network world portal, or to user's buds list in the social media application network buds portal, and with further options to share Feature to external social media networks.

According to an embodiment of the method and process, allowing users to view, interact, and engage with Features uploaded to world portal with further options for search functionality and categorization for Feature submissions and user options for supporting.

According to an embodiment of the method and process, allowing users to view, interact, and engage with Features uploaded to buds portal with further options for search functionality and access to private messenger. Users have options for supporting submitted Features.

According to an embodiment of the method and process, allowing user to view Features in full-screen playback mode within the world portal providing functionalities comprised of reposting, sharing, commenting, supporting, and favorite user and favorite Feature option.

According to an embodiment of the method and process, allowing users to view Features in full-screen playback mode within the buds portal providing functionalities comprised of commenting, and supporting.

According to an embodiment of the method and process, providing a user favorite page allowing users to follow and view a favored user's latest Features uploads and providing user ability to view user's saved favored Features.

According to an embodiment of the method and process, allowing users to access profile page comprised of user's face and system name, access to archived Features, access to alerts, and access to user's metrics for Features submitted.

According to an embodiment of the method and process, enabling user to save back-end event only recording to video gallery, to save video file downloaded from internet to video gallery, and browse and select video file from application's video gallery for use as second stream back-end event capture and recording upon which to simultaneously overlay user face-only capture and recording.

According to an embodiment of the method and process, enabling user to interact, engage, and create Feature via private messenger with options for viewing private messages sent and received and further options for creating Feature by initiating simultaneous recording of two video streams in private messenger with user options for sending Feature to user selected recipients from user's buds list.

BRIEF DESCRIPTIONS

Embodiments herein described with reference to drawings wherein reference numerals are used to refer to like elements throughout. The features described and or illustrated with respect to the embodiments are not necessarily drawn to scale and may be used in same or in a similar way in one or more embodiments. Although the method and process and description of screen capture embodiments and diagrams may show specific sequence for executing steps, the order of steps may be modified based on user interaction with application.

DETAILED DESCRIPTION OF EXAMPLE EMBODIMENTS

Figure 1:
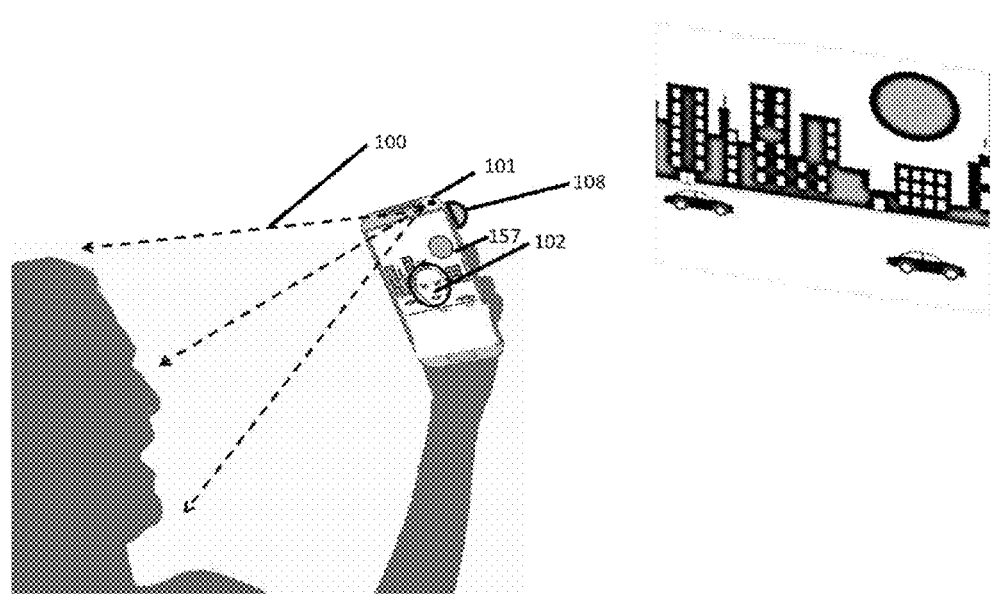
FIG. 1 illustrates method and process for simultaneous capture of two video streams comprised of user's face-only video utilizing front-end camera, image sensor and back-end event utilizing back-end camera.

The particular embodiments presented herein relate to a social networking environment and system that provides a platform for the integration of individual stories and user responses and interactions incorporating a process and methodology that enables the user to simultaneously capture, record and synthesize two video streams. Users join social networking systems and add new and pre-existing contacts to connect with one another and present unique aspects of events occurring in their lives. Upon becoming associated with a social network, users interact and engage with one another within the social network environment by posting, viewing, and commenting to stories and narratives in videos, messages, and other communication formats. The particular embodiments presented herein illustrate user's ability to video record an event and simultaneously video record user's participation in the recorded event and subsequently share the resulting recording of the experience within the network for all users to see, for only friends to see, on a private messaging basis shared with selected users, and shared to external networks. Implementation of the present disclosure enables users to record events while simultaneously and concurrently engaging and participating in the recorded event. The social media application software disclosed processes a mobile device's image sensors data and executes logical instructions, which include video capture of user face-only recording, utilizing continual auto-face-detection and auto-focus, displayed within an oval frame, combined with user option for avatar body, simultaneously overlaid on user's back-end event recording with mobile device's back-end camera, synthesized as one complete recording, hereafter referred to as Feature, and shared in social media network. The disclosure further illustrates application functionality to create new content and re-involve user in prior captured videos by enabling a user to record a face-only video in an oval frame overlaid on simultaneous playback of a pre-recorded video. Other embodiments are readily envisioned by the disclosure and are described in detail below. It should be noted while the method and process disclosed herein are generally discussed in the example context of mobile computing devices, the present disclosure is not so limited. In some cases, the disclosure can be used with non-mobile devices such as desktop computers, video conferencing systems, etc., in accordance with some embodiments. Also, while it should be noted that the disclosed method and process are generally discussed in the example context of mobile device video creation, it can also be used, in a video-based collaborative context, such as peer to peer or multi-point video conferencing, virtual classroom, mobile device game applications, automobile dash cameras applications, and live peer to peer video-based communications where users share videos and or require simultaneous synthesizing of two video streams as provided. Furthermore, as can be noted, various embodiments may be implemented via software application systems, firmware, hardware, and or a combination thereof. Embodiments herein described with reference to drawings wherein reference numerals are used to refer to like elements throughout. The features described and or illustrated with respect to the embodiments are not necessarily drawn to scale and may be used in same or in a similar way in one or more embodiments. Although the method and process and description of embodiments may show specific sequence for executing steps, the order of steps may be modified based on user interaction with application.

FIG. 1 this embodiment illustrates application process of mobile device image sensor 100 data for auto-face detection and capture of user's face-only 102 utilizing front-end camera 101 and simultaneous video capture of back-end event 103 utilizing mobile device's back-end camera 108 displayed on screen 157.

Figure 2:
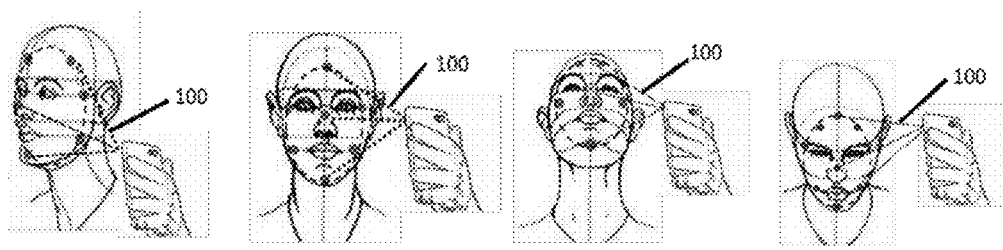
FIG. 2 illustrates an image sensor process for detection and capture of user's face in multiple positions.

FIG. 2 this embodiment illustrates user's face in multi-positions with continual auto-face-detection and auto-focus utilizing image sensor 100 for capture of user's face.

Figure 3:
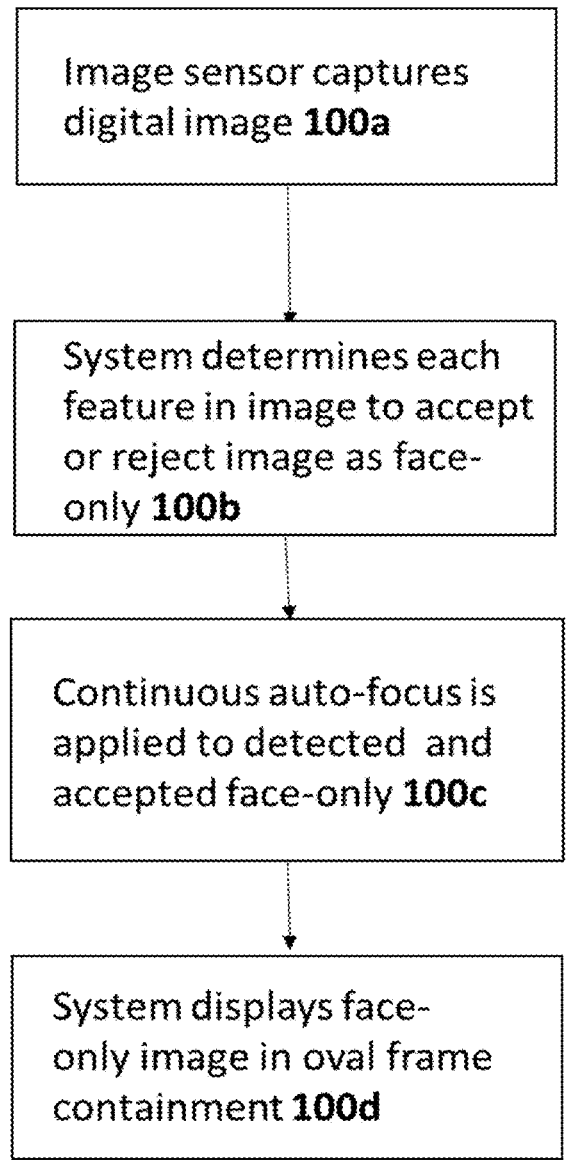
FIG. 3 illustrates flowchart diagram of application process of image sensor capture and display of user's face in oval frame.

FIG. 3 this embodiment illustrates a flowchart diagram depicting a method and process for auto-face-detection and auto-focus of user face-only video capture and recording. Application utilizes image sensor 100a to capture a digital image and performs logical instructions in assessment of each feature in the digital image to determine whether or not the image is accepted or rejected as a face-only 100b. Continual auto-focus is applied to detected and accepted face-only 100c in capture mode, with a resulting system display of user face-only image in oval frame containment 100d.

Figure 4:
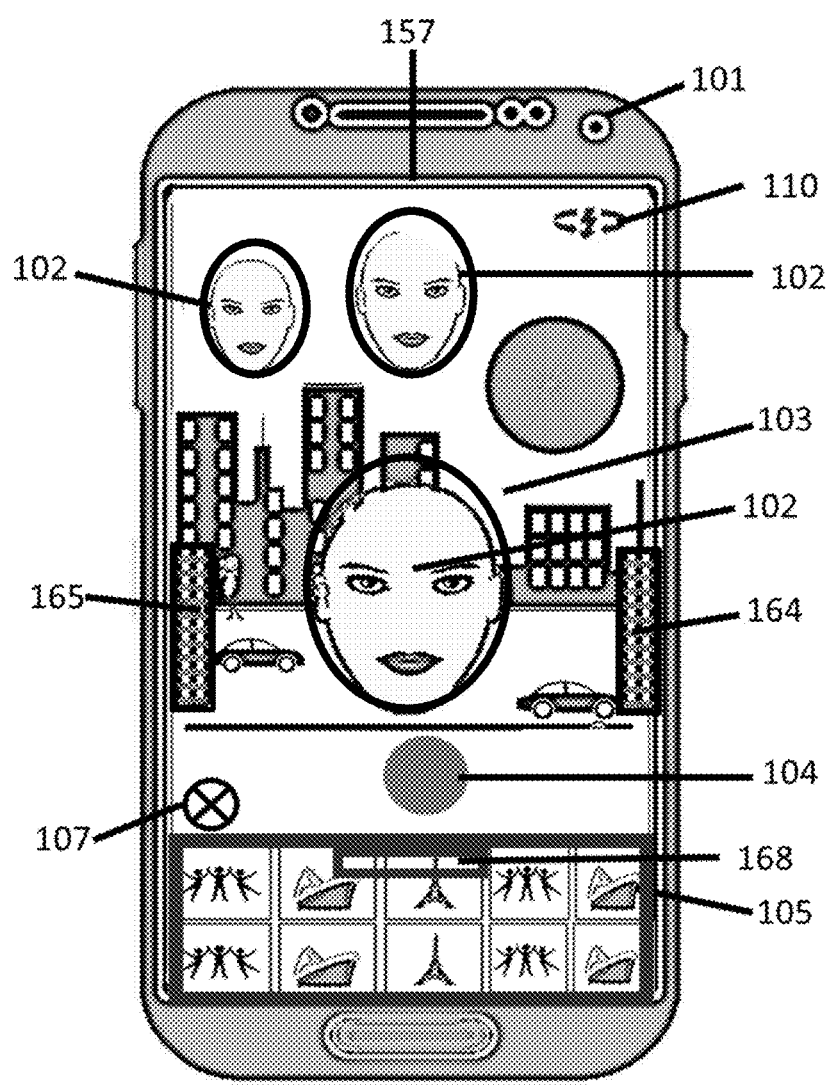
FIG. 4 is a screen capture of one embodiment of the image based social media network application of the method and shows simultaneous two stream video capture, move-ability and size-ability of face-only in oval frame, and video gallery.

FIG. 4 this embodiment illustrates social media application's simultaneous capture of two video streams, comprised of front-end camera's 101 capture of user's face-only 102 and back-end camera's capture of back-end event 103. In camera capture mode user has option to position and size face-only 102 in oval frame on simultaneous capture of back-end event 103 on screen 157. In this illustration user has option to simultaneously commence record 104 of two video streams. Alternatively, user has option to remove 107 face-only 102 capture, browse video gallery 105, or initiate front-end light 110. Navigational swipe-right gesture to access profile page 165 or swipe-left gesture to access to world portal and buds portal 164, and user options to access video gallery 168 via navigational swipe-up gesture.

Figure 5:
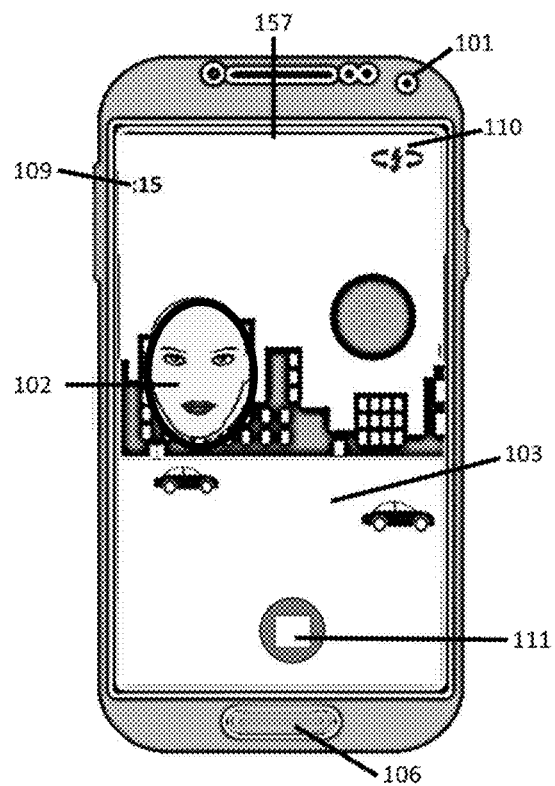
FIG. 5 is a screen capture of one embodiment of the image based social media network application of the method and shows simultaneous recording of two streams.

FIG. 5 this embodiment illustrates user initiated simultaneous recording of two video streams comprised of front-end camera's 101 recording of user's face-only 102 in oval frame video narrative overlaid on back-end camera's video recording of back-end event 103 utilizing microphone 106 for audio input. In record mode user has option to position and size face-only 102 in oval frame on simultaneous recording of back-end event 103 on screen 157. Timer 109 displays recording time progression. User has option to initiate front-end light 110 for low-light conditions. User stops recording 111 to complete end simultaneous two stream recording.

Figure 6:
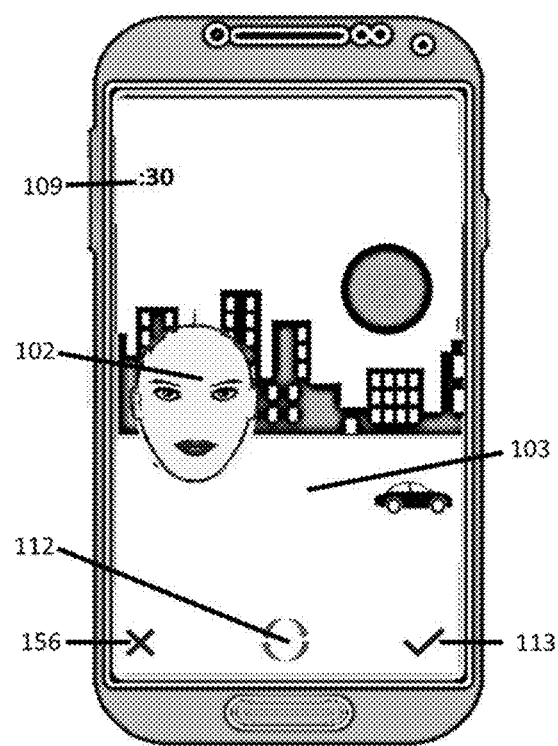
FIG. 6 is a screen capture of one embodiment of the image based social media network application of the method and shows playback of synthesized and combined streams hereafter referred to as Feature.

FIG. 6 this embodiment illustrates a user completed recording in playback mode comprised of face-only 102 video overlaid on back-end event 103 video synthesized as one video recording, hereafter referred to as Feature. Timer 109 displays length of Feature. User options include playback 112 to replay Feature recording, to delete recording 156 and redirects user to camera capture mode, and to save and proceed 113 Feature which automatically saves Feature to user's video gallery and directs user to FIG. 7.

Figure 7:
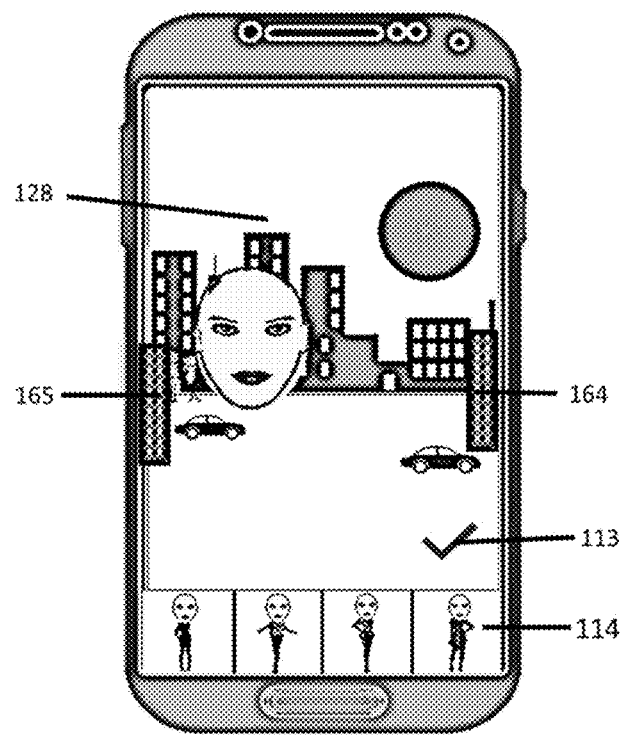
FIG. 7 is a screen capture of one embodiment of the image based social media network application of the method and shows option to edit Feature with avatar selection.

FIG. 7 this embodiment illustrates user options to alter and edit feature 128 with avatar selection 114 or to save and proceed 113 with Feature with no avatar body. User may utilize navigational swipe-right gesture to access profile page 165 or navigational swipe-left gesture to access world portal and buds portal 164.

Figure 8:
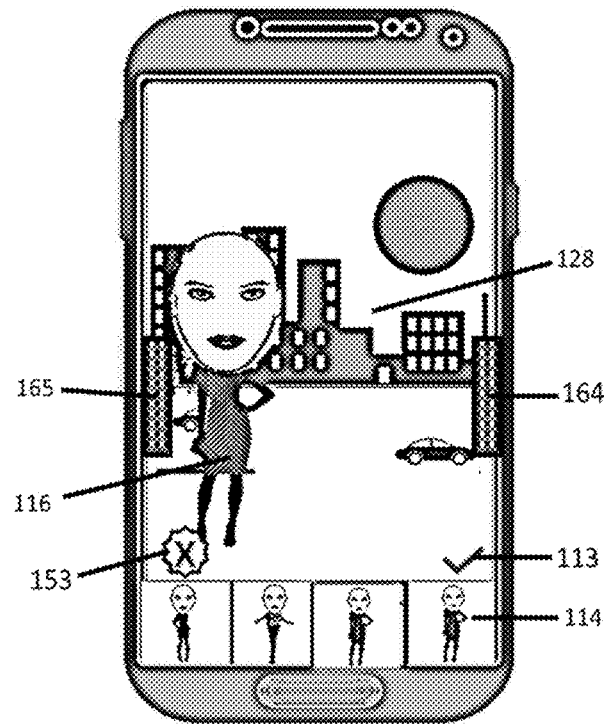
FIG. 8 is a screen capture of one embodiment of the image based social media network application of the method and shows Feature with user selected avatar body beneath face-only recording.

FIG. 8 this embodiment illustrates user edited Feature 128 with selected avatar body 116 from avatar selection 114. User options include remove avatar body 153 and return user to FIG. 7. Alternatively, user can save and proceed 113 Feature 128 with avatar body 116. User may utilize navigational swipe-right gesture to access profile page 165 or navigational swipe-left gesture to access world portal and buds portal 164.

Figure 9:
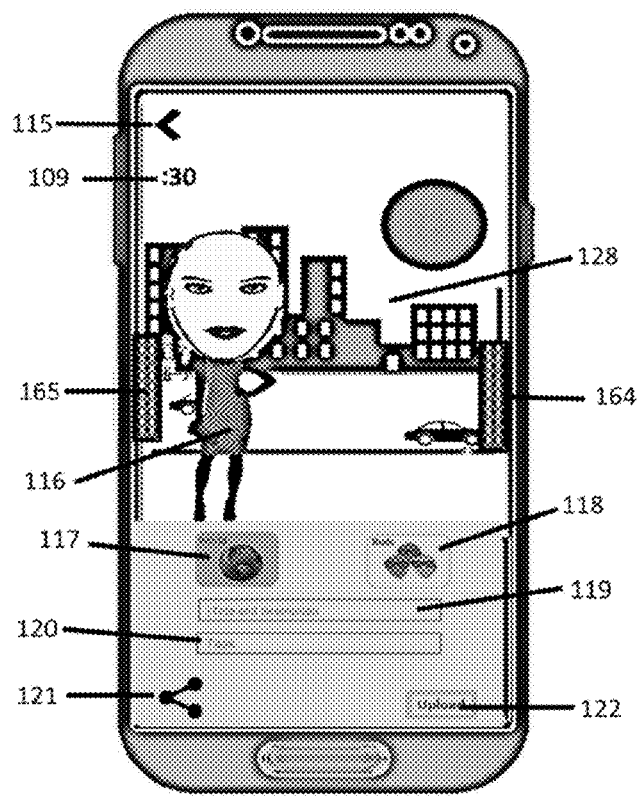
FIG. 9 is a screen capture of one embodiment of the image based social media network application of the method and shows user selection of world portal option for uploading Feature with avatar body.

FIG. 9 this embodiment illustrates user portal options for uploading Feature 128 with avatar body 116. Portal options are comprised of world portal option 117 which allow user to upload Feature 128 to entire social media application network and buds portal option 118 which allows users to upload Feature 128 to user's buds list only. In this embodiment user has selected world portal option 117. Timer 109 displays length of Feature. User is required to input title and description 119 and input tags 120 for classification and search purposes for uploading Feature 128 only in world portal. User has the option to share 121 to external networks. User has option to go back 115 to prior screen FIG. 6 or to upload 122 to selected portal and or share Feature 128. User may utilize navigational swipe-right gesture to access profile page 165 or navigational swipe-left gesture to access world portal and buds portal 164.

Figure 10:
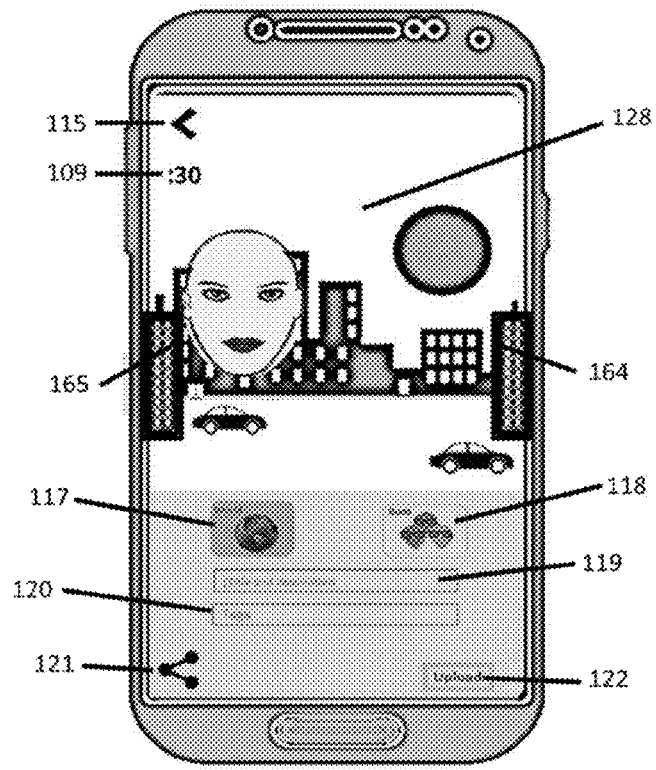
FIG. 10 is a screen capture of one embodiment of the image based social media network application of the method and shows user selection of world portal option for uploading Feature.

FIG. 10 this embodiment illustrates user portal options for uploading Feature 128. Portal options are comprised of world portal option 117 which allow users to upload Feature 128 to entire social media application network and buds portal option 118 which allows users to upload Feature 128 to user's buds list only. In this embodiment user has selected world portal option 117. Timer 109 displays length of Feature. User is required to input title and description 119 and input tags 120 for classification and search purposes for uploading Feature 128 only in world portal. User has the option to share 121 to external networks. User has option to go back 115 to prior screen FIG. 6 or to upload 122 to selected portal and or share Feature 128. User may utilize navigational swipe-right gesture to access profile page 165 or navigational swipe-left gesture to access world portal and buds portal 164.

Figure 11:
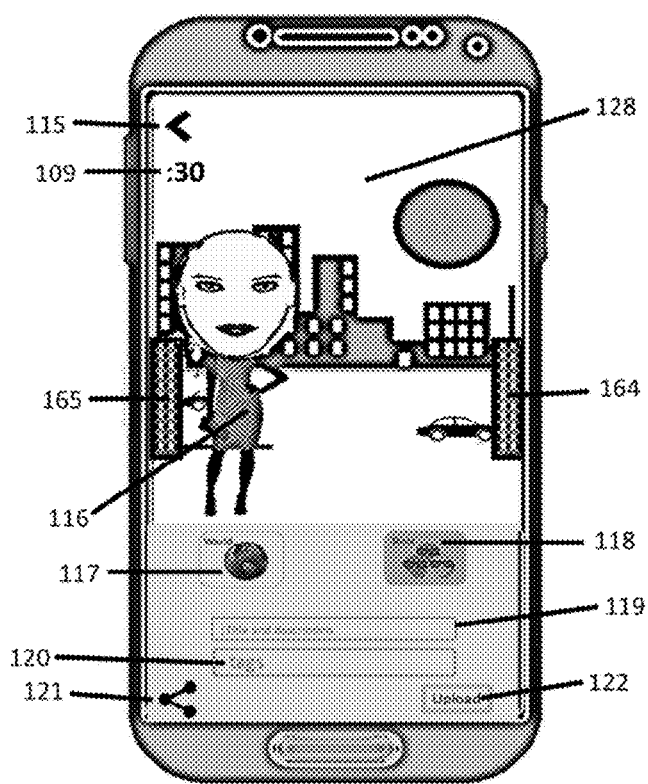
FIG. 11 is a screen capture of one embodiment of the image based social media network application of the method and shows user selection of buds portal option for uploading Feature with avatar body.

FIG. 11 this embodiment illustrates user portal options for uploading Feature 128 with avatar body 116. Portal options are comprised of world portal option 117 which allow user to upload Feature 128 to entire social media application network and buds portal option 118 which allows users to upload Feature 128 to user's buds list only. In this embodiment user has selected buds portal option 118. Timer 109 displays length of Feature. User is required to input title and description 119 and input tags 120 for classification and search purposes for uploading Feature 128 only in buds portal. User has the option to share 121 to external networks. User has option to go back 115 to prior screen FIG. 6 or to upload 122 to selected portal and or share Feature 128. User may utilize navigational swipe-right gesture to access profile page 165 or navigational swipe-left gesture to access world portal and buds portal 164.

Figure 12:
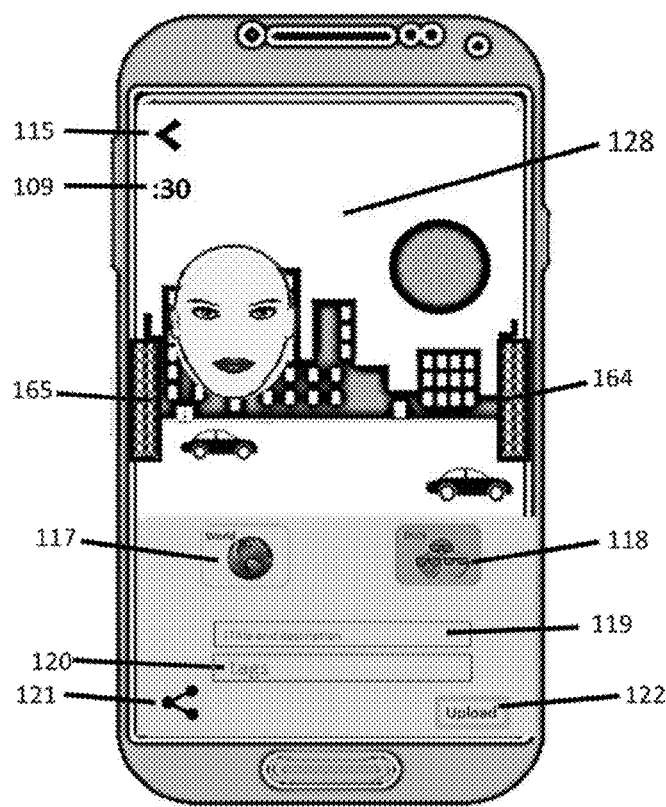
FIG. 12 is a screen capture of one embodiment of the image based social media network application of the method and shows user selection of buds portal option for uploading Feature.

FIG. 12 this embodiment illustrates user portal options for uploading Feature 128. Portal options are comprised of world portal option 117 which allow user to upload Feature 128 to entire social media application network and buds portal option 118 which allows users to upload Feature 128 to user's buds list only. In this embodiment user has selected buds portal option 118. Timer 109 displays length of Feature. User is required to input title and description 119 and input tags 120 for classification and search purposes for uploading Feature 128 only in buds portal. User has the option to share 121 to external networks. User has option to go back 115 to prior screen FIG. 6 or to upload 122 to selected portal and or share Feature 128. User may utilize navigational swipe-right gesture to access profile page 165 or navigational swipe-left gesture to access world portal and buds portal 164.

Figure 13:
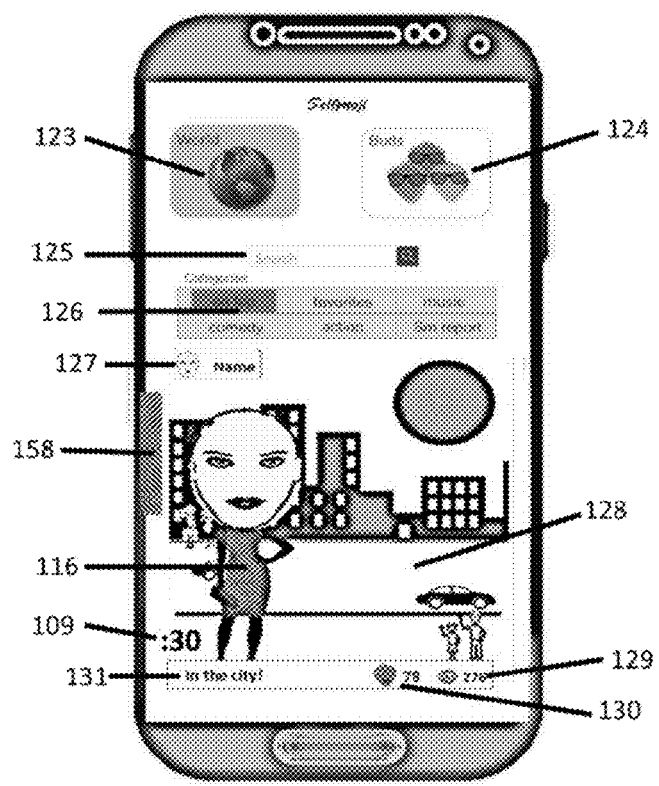
FIG. 13 is a screen capture of one embodiment of the image based social media network application of the method and shows Feature uploaded to world portal with avatar body.

FIG. 13 this embodiment illustrates Feature 128 with avatar body 116 uploaded to world portal 123 enabling all users in the social media application network to interact and engage by viewing, searching, and supporting uploaded Features. User options include search 125 enabling users to enter keywords to search for Features 128. Users can additionally view grouped categories 126 of similar subjects. All features uploaded to world portal 123 provide a profile tab 127 depicting face and system name of user that submitted feature. View count icon 129 provides a metric for the number of times a feature has been viewed. Support icon 130 further enables users to express support and approval for viewed features. Feature title and description 131 represents user inputted title and description for feature and timer 109 represents length of feature. This embodiment further illustrates user options to access buds portal 124 and access to camera capture 158 via navigational swipe-right gesture.

Figure 14:
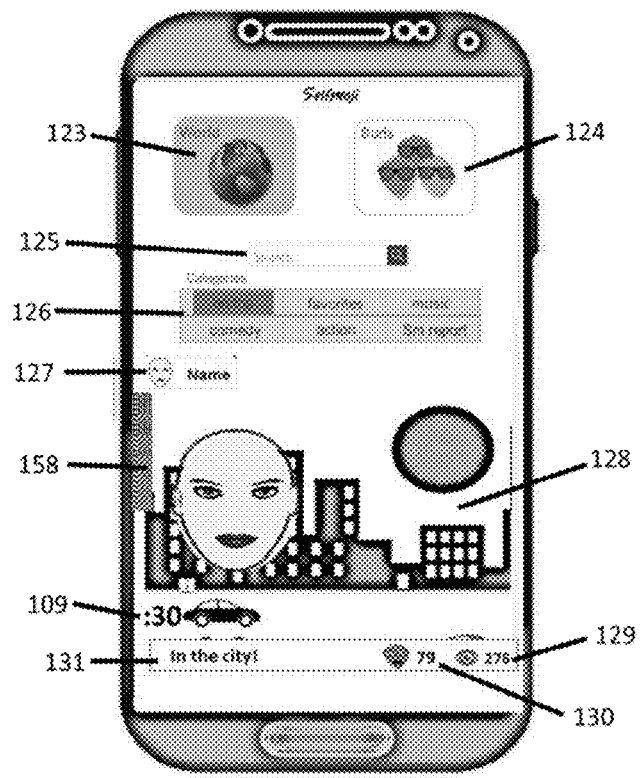
FIG. 14 is a screen capture of one embodiment of the image based social media network application of the method and shows Feature uploaded to world portal.

FIG. 14 this embodiment illustrates Feature 128 uploaded to world portal 123 enabling all users in the social media application network to interact and engage by viewing, searching, and supporting uploaded Features. User options include search 125 enabling users to enter keywords to search for Features 128. Users can additionally view grouped categories 126 of similar subjects. All features uploaded to world portal 123 provide a profile tab 127 depicting face and system name of user that submitted feature. View count icon 129 provides a metric for the number of times a feature has been viewed. Support icon 130 further enables users to express support and approval for viewed features. Feature title and description 131 represents user inputted title and description for Feature and timer 109 represents length of feature. This embodiment further illustrates user options to access buds portal 124 and access to camera capture 158 via navigational swipe-right gesture.

Figure 15:
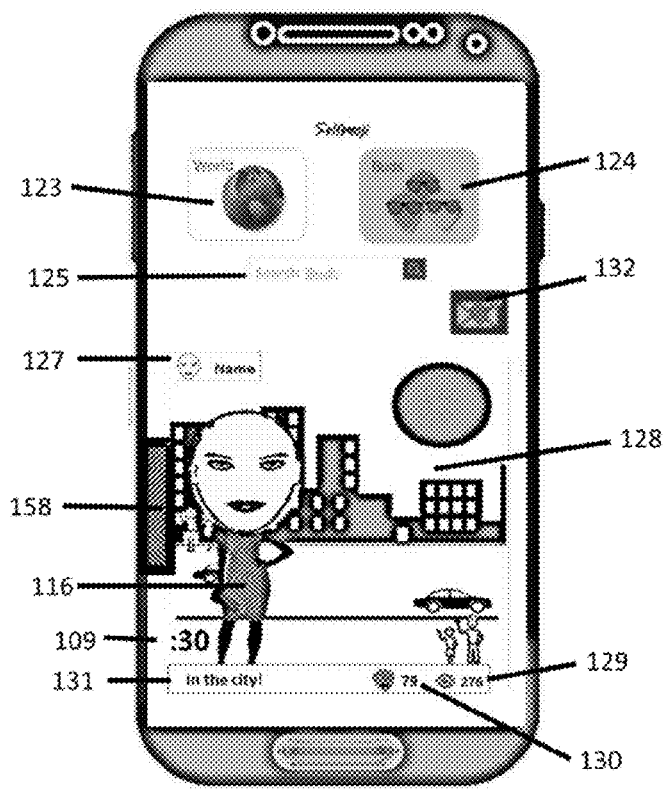
FIG. 15 is a screen capture of one embodiment of the image based social media network application of the method and shows Feature uploaded to buds portal with avatar body.

FIG. 15 this embodiment illustrates Feature 128 uploaded to buds portal 124 with avatar body 116 enabling users in the social media application network to interact and engage with established contacts by viewing, searching, and supporting uploaded Features. User options include search 125 enabling users to enter keywords to search for Features 128. All features uploaded to buds portal 124 provide a profile tab 127 depicting face and system name of user that submitted feature. View count icon 129 provides a metric of the number of times a Feature has been viewed. Support icon 130 further enables users to express support and approval for viewed features. Feature title and description 131 represents user inputted title and description for feature and timer 109 represents length of feature. Private messenger icon 132 provides access to private messenger. This embodiment further illustrates user options to access world portal 123 and access to camera capture 158 via navigational swipe-right gesture.

Figure 16:
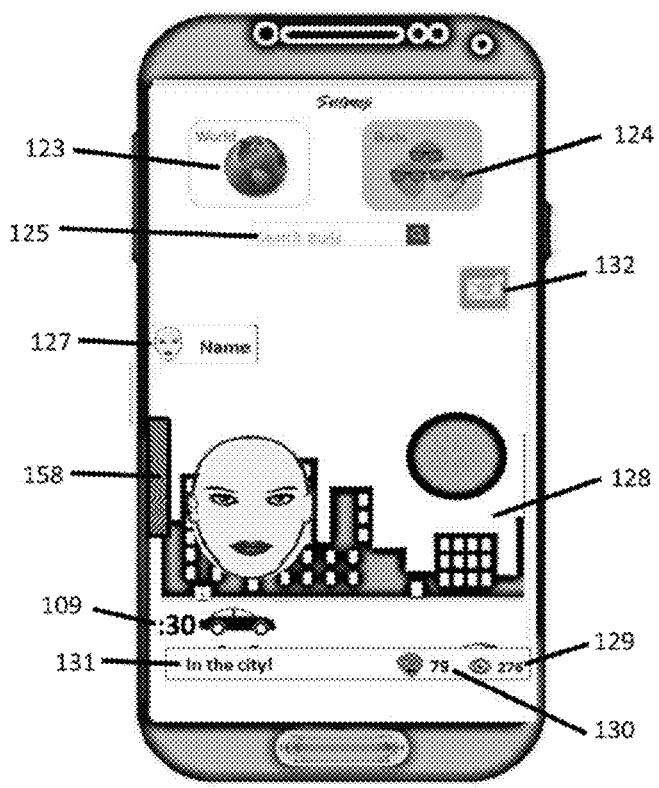
FIG. 16 is a screen capture of one embodiment of the image based social media network application of the method and shows Feature uploaded to buds portal.

FIG. 16 this embodiment illustrates Feature 128 uploaded to buds portal 124 enabling users in the social media application network to interact and engage with established contacts by viewing, searching, and supporting uploaded Features. User options include search 125 enabling users to enter keywords to search for Features 128. All features uploaded to buds portal 124 provide a profile tab 127 depicting face and system name of user that submitted feature. View count icon 129 provides a metric for the number of times a Feature has been viewed. Support icon 130 further enables users to express support and approval for viewed Features. Feature title and description 131 represents user inputted title and description for Feature and timer 109 represents length of Feature. Private messenger icon 132 provides access to private messenger. This embodiment further illustrates user options to access world portal 123 and access to camera capture 158 via navigational swipe-right gesture.

Figure 17:
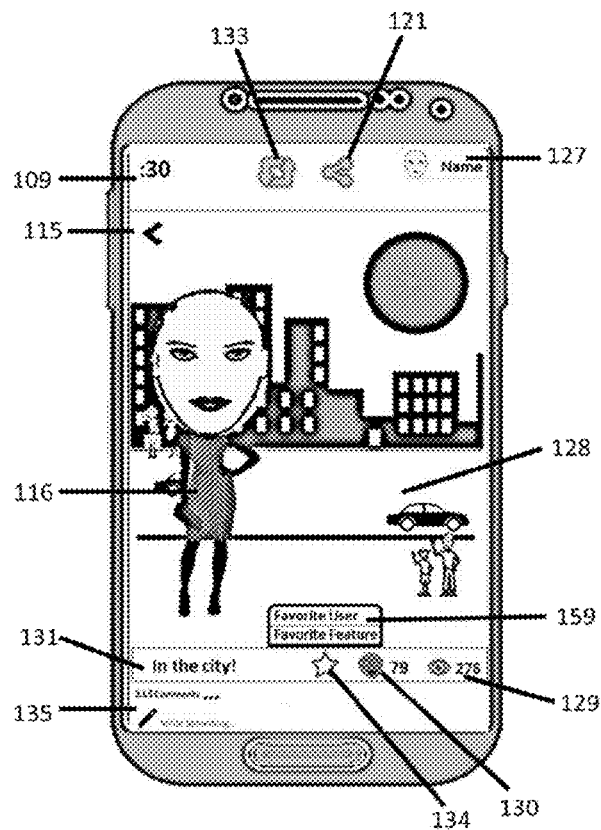
FIG. 17 is a screen capture of one embodiment of the image based social media network application of the method and shows Feature with avatar body in world portal playback mode.

FIG. 17 this embodiment illustrates user selected Feature 128 with avatar body 116 from world portal in video playback mode detailing profile tab 127 depicting face and system name of user that submitted Feature, Feature title and description 131 representing user inputted title and description for feature and timer 109 represents length of Feature. View count icon 129 provides a metric for the number of times a Feature has been viewed. Support icon 130 further enables users to express support and approval for viewed Features. This embodiment further illustrates interaction and engagement by allowing user to input written comments 135, share 121 viewed Feature to external networks, as well as to repost 133 allowing user to re-submit viewed Feature to world portal and buds portal. Users have option to select favorite icon 134 enabling user to select favorite user or favorite feature option 159 save to user's favorite page. User option to select back 115 allows user to go back to prior screen FIG. 13.

Figure 18:
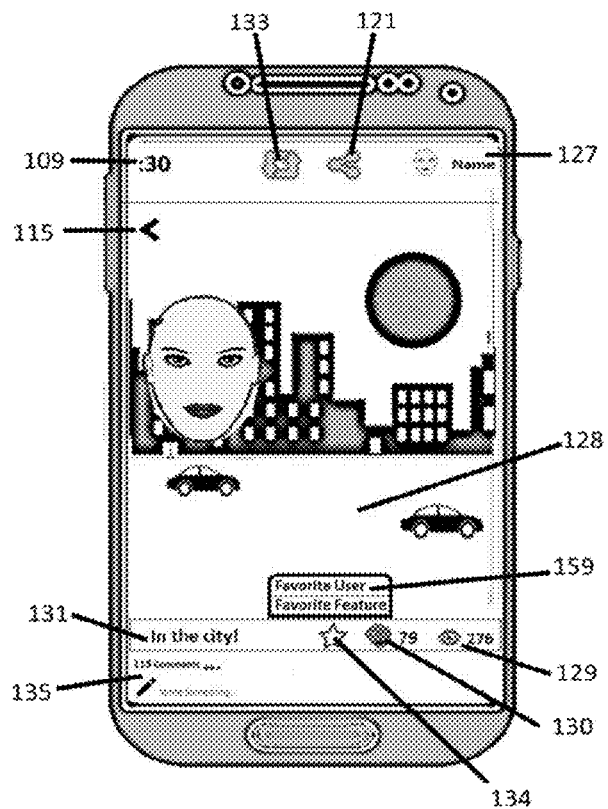
FIG. 18 is a screen capture of one embodiment of the image based social media network application of the method and shows Feature in world portal playback mode.

FIG. 18 this embodiment illustrates user selected Feature 128 from world portal in video playback mode detailing profile tab 127 depicting face and system name of user that submitted Feature, Feature title and description 131 representing user inputted title and description for Feature and timer 109 represents length of Feature. View count icon 129 provides a metric for the number of times a feature has been viewed. Support icon 130 further enables users to express support and approval for viewed Features. This embodiment further illustrates interaction and engagement by allowing user to input written comments 135, share 121 viewed Feature to external networks, as well as to repost 133 allowing user to re-submit viewed Feature to world portal and buds portal. Users have option to select favorite icon 134 enabling user to select favorite user or favorite feature option 159 save to user's favorite page. User option to select back 115 allows user to go back to prior screen FIG. 13.

Figure 19:
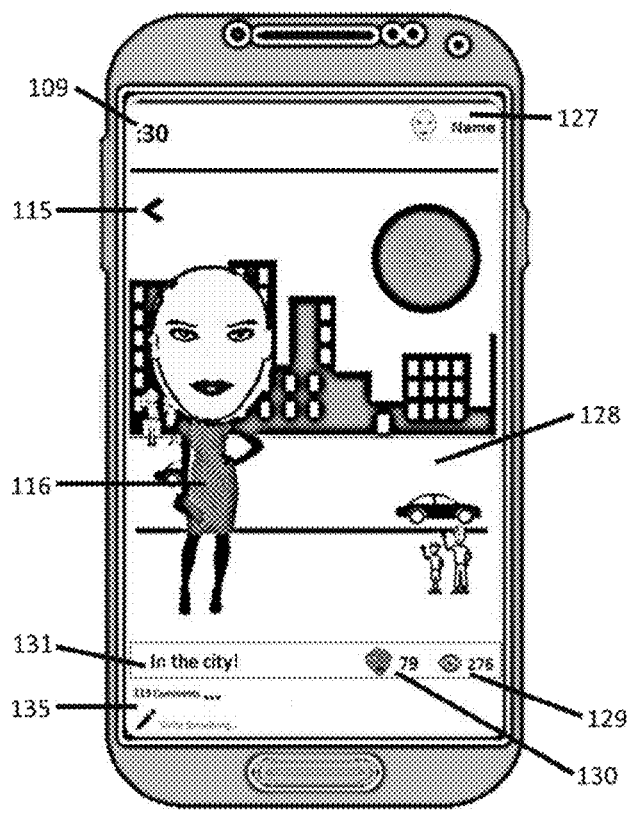
FIG. 19 is a screen capture of one embodiment of the image based social media network application of the method and shows Feature with avatar body in buds portal playback mode.

FIG. 19 this embodiment illustrates user selected Feature 128 with avatar body 116 from buds portal in video playback mode detailing profile tab 127 depicting face and system name of user that submitted Feature, Feature title and description 131 representing user inputted title and description for Feature and timer 109 represents length of Feature. View count icon 129 provides a metric of the number for the number of times a Feature has been viewed. Support icon 130 further enables users to express support and approval for viewed Features. This embodiment further illustrates interaction and engagement by allowing user to input written comments 135. User option to select back 115 allows user to go back to prior screen FIG. 15.

Figure 20:
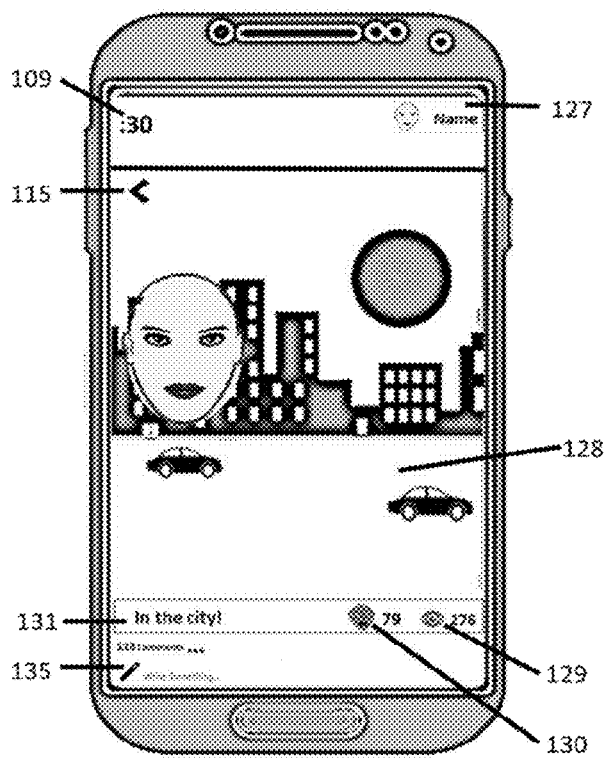
FIG. 20 is a screen capture of one embodiment of the image based social media network application of the method and shows Feature in buds portal playback mode.

FIG. 20 this embodiment illustrates user selected Feature 128 from buds portal in video playback mode detailing profile tab 127 depicting face and system name of user that submitted Feature, Feature title and description 131 representing user inputted title and description for Feature and timer 109 represents length of feature. View count icon 129 provides a metric for the number of times a Feature has been viewed. Support icon 130 further enables users to express support and approval for viewed Features. This embodiment further illustrates interaction and engagement by allowing user to input written comments 135. User option to select back 115 allows user to go back to prior screen FIG. 15.

Figure 21:
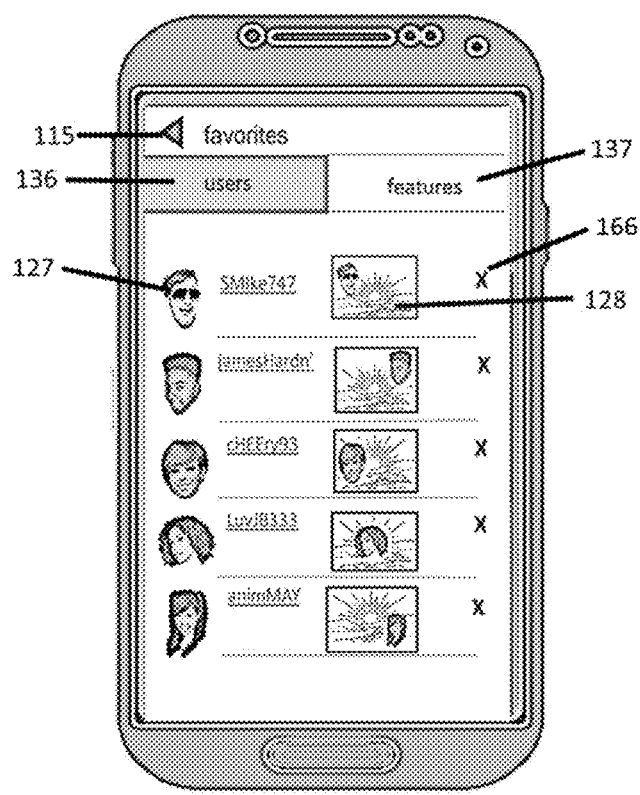
FIG. 21 is a screen capture of one embodiment of the image based social media network application of the method and shows page of user's favored users.

FIG. 21 this embodiment illustrates user's favorite page comprised of a user's favored users. Favored users tab 136 allows users to follow and view a favored user's latest Feature 128 uploads. Profile tab 127 depicting face and system name of user that submitted feature. User has option to delete favored 166 user from favorite page. Favorite Feature tab 137 allows user to access user's saved favored Features. User option to select back 115 allows user to go back to prior screen FIG. 13.

Figure 22:
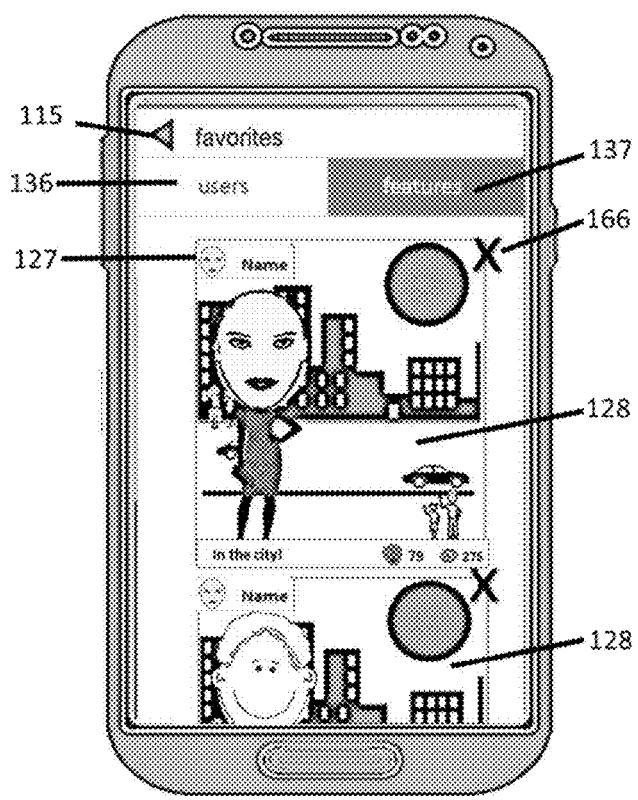
FIG. 22 is a screen capture of one embodiment of the image based social media network application of the method and shows page of user's favorite Features.

FIG. 22 this embodiment illustrates user's favorite page comprised of a Favorite Feature tab 137 allows user to view user's saved favored Features 128. Profile tab 127 depicting face and system name of user that submitted feature. User has option to delete favored 166 Feature from favorite page. Favorite user tab 136 allows users to follow and view a favored user's latest Feature 128 uploads. User option to select back 115 allows user to go back to prior screen FIG. 13.

Figure 23:
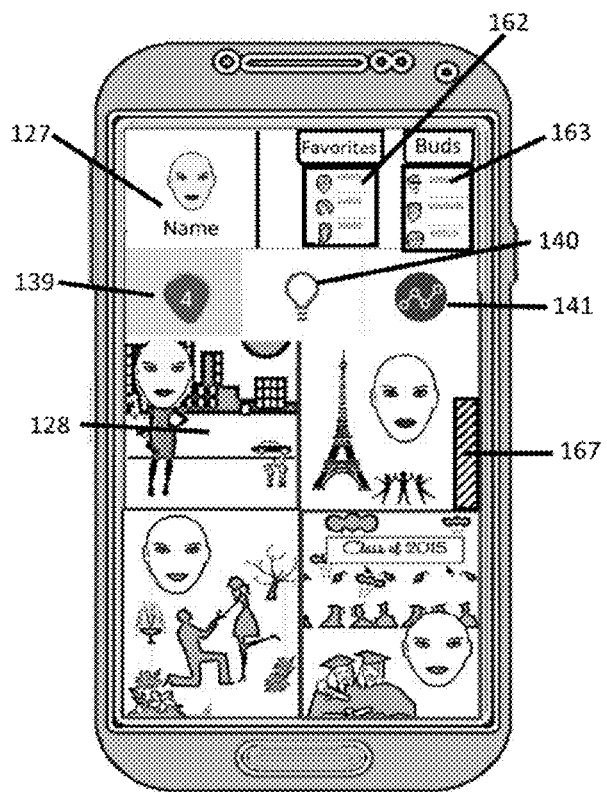
FIG. 23 is a screen capture of one embodiment of the image based social media network application of the method and shows user's archived Features in profile page.

FIG. 23 this embodiment illustrates user's profile page comprised of profile tab 127 depicting face and system name of user and user's favorite list 162, and user's buds list 163 representing user's contacts from buds portal. This embodiment further illustrates archived Feature tab 139 indicating number of archived Features and provides access to archived Features 128. Additional options include alerts tab 140 allowing user to access system notifications and user metric tab 141 allowing user to access metrics on Features they have uploaded. Access to camera capture 167 is provided via navigational swipe-left gesture.

Figure 24:
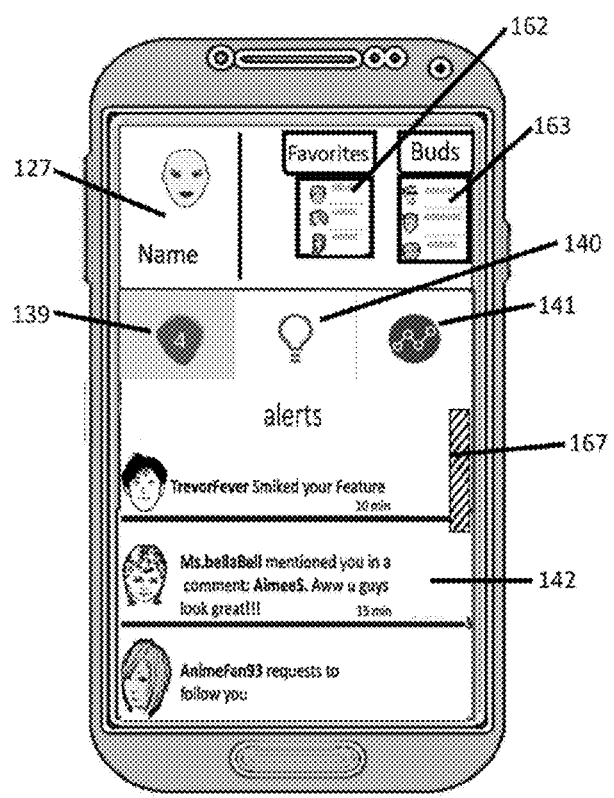
FIG. 24 is a screen capture of one embodiment of the image based social media network application of the method and shows alerts in user's profile page.

FIG. 24 this embodiment illustrates user's profile page comprised of profile tab 127 depicting face and system name of user and user's favorite list 162, and user's buds list 163 representing user's contacts from buds portal. This embodiment further illustrates alerts tab 140 allowing user to view received system notifications 142 on user engagement within the social media application. Additional options archived Feature tab 139 indicating number of Features and provides access to archived Features and user metric tab 141 allows user access to metrics on Features they have uploaded. Access to camera capture 167 is provided via navigational swipe-left gesture.

Figure 25:
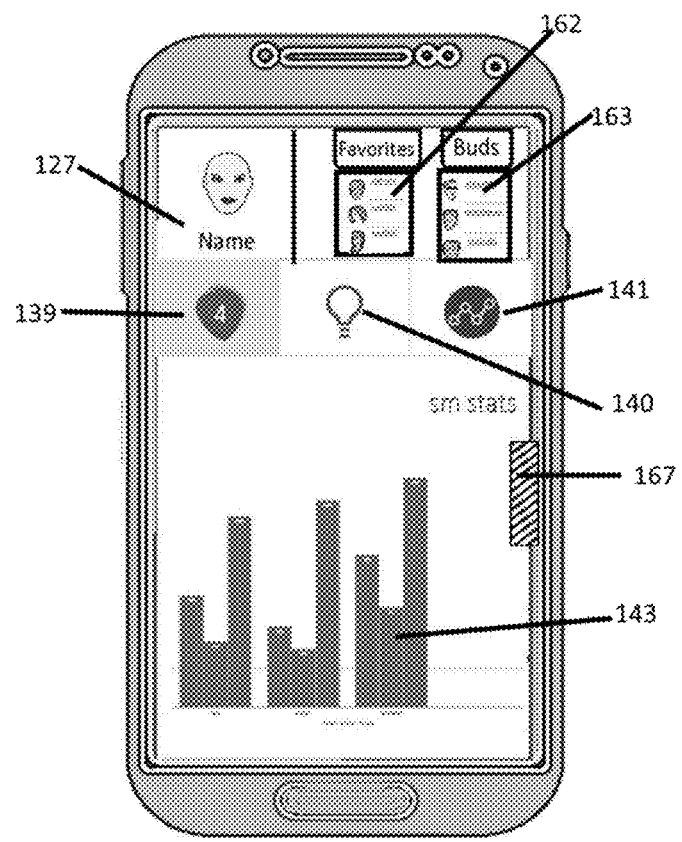
FIG. 25 is a screen capture of one embodiment of the image based social media network application of the method and shows user's analytics in user's profile.

FIG. 25 this embodiment illustrates user's profile page comprised of user metric tab 141 detailing analytics 143 of system data of user engagement for user's uploaded Features. Profile tab 127 depicts face and system name of user and user's favorite list 162, and user's buds list 163 representing user's contacts from buds portal. Additional options include alerts tab 140 allowing user to access system notifications and archived Feature tab 139 indicating number of features and provides access to archived Features. Access to camera capture 167 is provided navigational swipe-left gesture.

Figure 26:
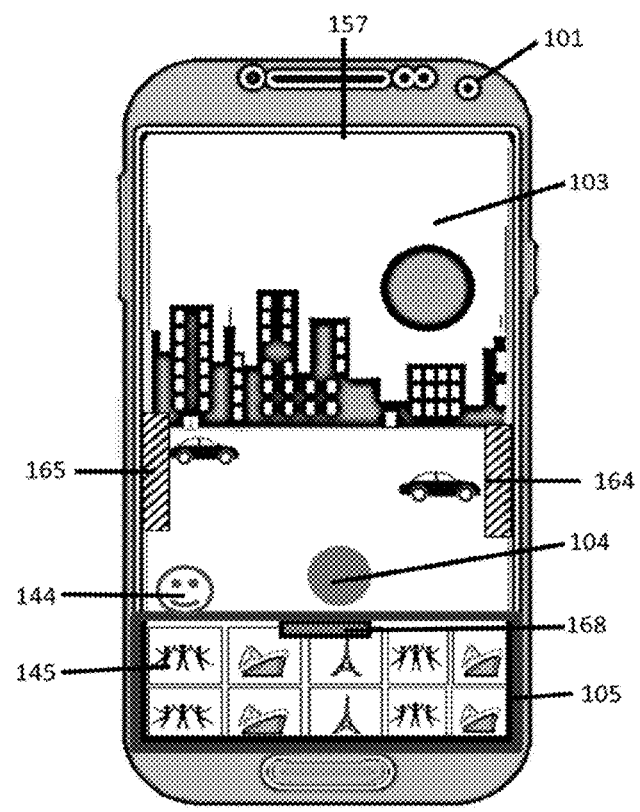
FIG. 26 is a screen capture of one embodiment of the image based social media network application of the method and shows back-end only camera capture and video gallery.

FIG. 26 this embodiment illustrates social media application's camera capture mode of back-end event 103 with user options to capture and record in three distinct ways. User has option to initiate simultaneous two stream recording icon 144 for simultaneous capture of two video streams comprised of front-end camera's 101 capture of user's face-only and back-end camera's capture of back-end event 103. User also has option to browse video gallery 105, to select a pre-recorded video file 145, and to initiate simultaneous two stream recording icon 144 for simultaneous capture of two video streams comprised of front-end camera's 101 face-only capture overlaid on video playback of pre-recorded back-end event. Additionally user can capture and record 104 back-end event 103 and save to video gallery 105 for later use as back-end event 103. User options to access video gallery 168 via navigational swipe-up gesture, to access world portal and buds portal 164 via navigational swipe-left gesture and to access to profile page 165 via navigational swipe-right gesture.

Figure 27:
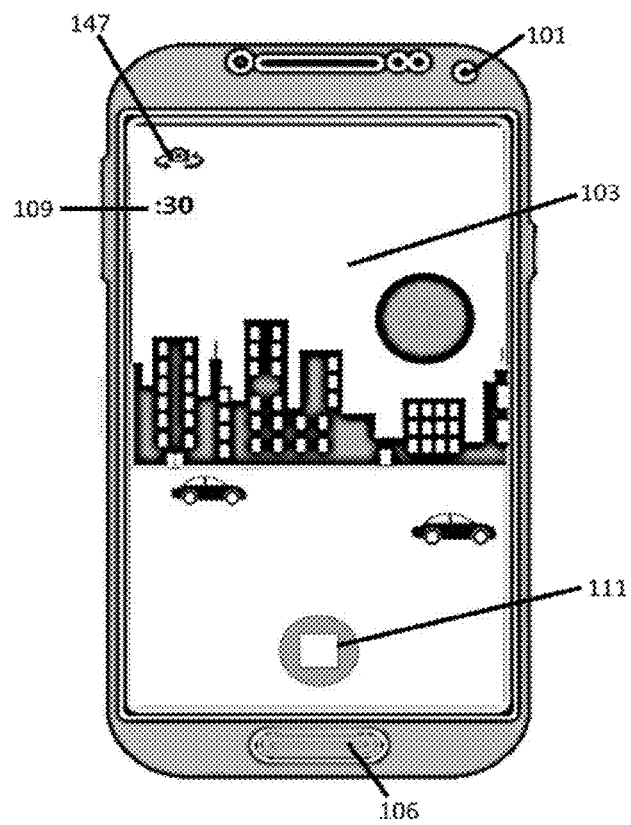
FIG. 27 is a screen capture of one embodiment of the image based social media network application of the method and shows user recording of back-end event with back-end camera.

FIG. 27 this embodiment illustrates social media application record mode of back-end event 103 with microphone 106 for audio input. Timer 109 display recording time and front back switch icon 147 enables user to switch back-end camera to front-end camera and vice-versa. User completes recording of back-end event 103 by initiating stop recording 111.

Figure 28:
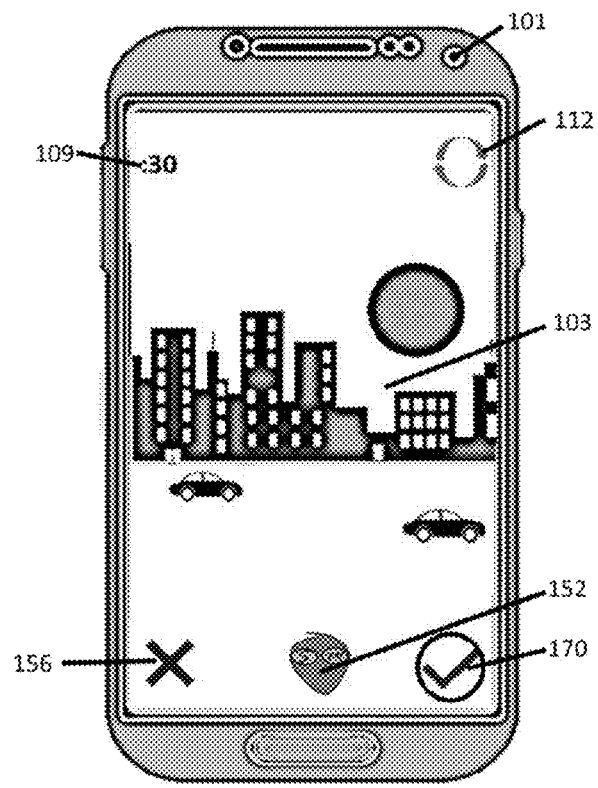
FIG. 28 is a screen capture of one embodiment of the image based social media network application of the method and shows completed back-end event recording in playback mode.

FIG. 28 this embodiment illustrates a completed back-end event 103 video recording with user options for playback 112 enabling user to preview recording. Timer 109 displays completed recording time. User has option to delete recording 156 and is directed back to FIG. 26. User also has option to save to video gallery 170 completed back-end event 103 recording. User has option to initiate face-only icon 152 to commence face-only capture utilizing front-end camera's 101 simultaneously overlaid on video playback of pre-recorded back-end event 103.

Figure 29:
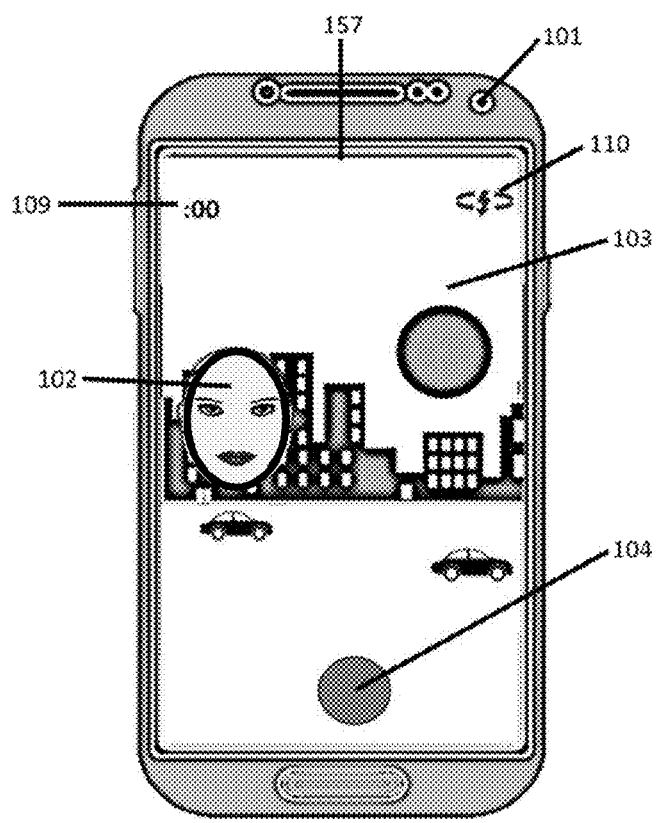
FIG. 29 is a screen capture of one embodiment of the image based social media network application of the method and shows capture of face-only recording overlaid on back-end event display.

FIG. 29 this embodiment illustrates user initiated face-only 102 capture mode utilizing front-end camera 101 overlaid on pre-recorded back-end event 103 in display mode. In record mode user has option to position and size face-only 102 recording in oval frame on simultaneous playback of pre-recorded back-end event 103 on screen 157. Timer 109 displays recording time and front-end light 110 provides lighting for face-only 102 for low-light conditions. User initiates record 104 to commence face-only 102 recording utilizing front-end camera's 101 overlaid on simultaneous video playback of pre-recorded back-end event 103.

Figure 30:
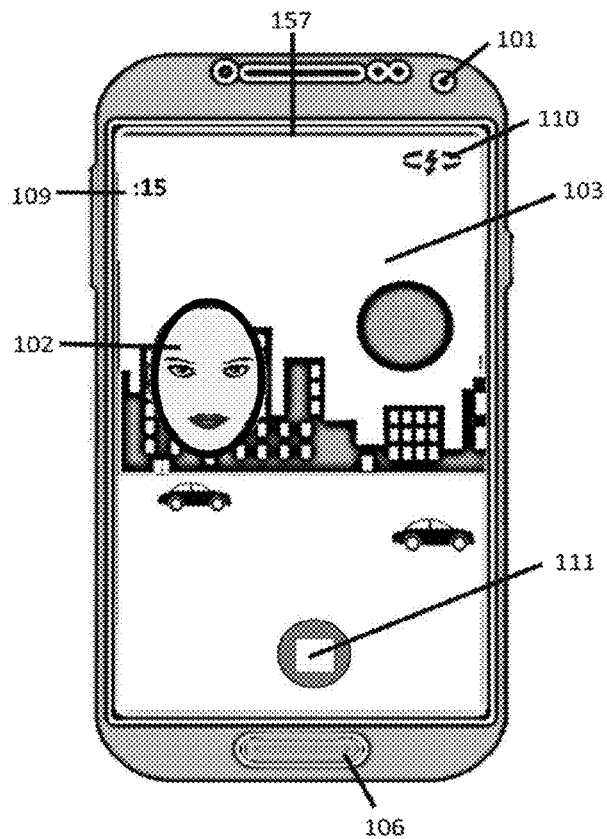
FIG. 30 is a screen capture of one embodiment of the image based social media network application of the method and shows recording of face-only video overlaid on back-end event playback.

FIG. 30 this embodiment illustrates a user in record mode comprised of a face-only 102 utilizing front-end camera 101 and microphone 106 for audio input, overlaid on simultaneous playback of pre-recorded back-end event 103. In record mode user has option to position and size face-only 102 recording in oval frame on simultaneous playback of pre-recorded back-end event 103 on screen 157. Timer 109 displays recording progression and front-end light 110 provides lighting for face-only 102 for low-light conditions. User initiates stop record 111 to end recording.

Figure 31:
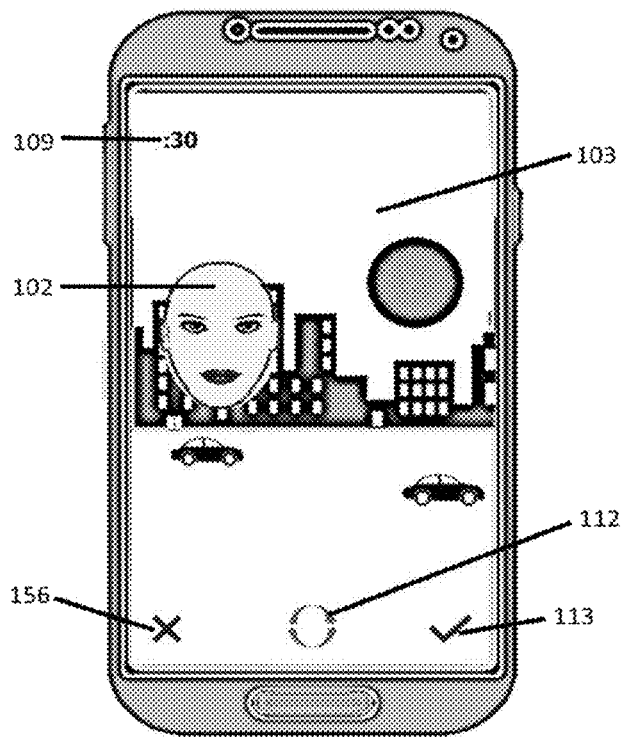
FIG. 31 is a screen capture of one embodiment of the image based social media network application of the method and shows playback of synthesized streams hereafter referred as Feature.

FIG. 31 this embodiment illustrates a completed user recording in playback 112 comprised of face-only 102 recording overlaid on pre-recorded back-end event 103 synthesized as one video recording, hereafter referred to as Feature. Timer 109 displays length of Feature. User options include playback 112 to preview Feature recording. Delete recording 156 redirects user to camera capture mode. Save and proceed 113 Feature automatically saves Feature to user's video gallery and directs user to FIG. 33.

Figure 32:
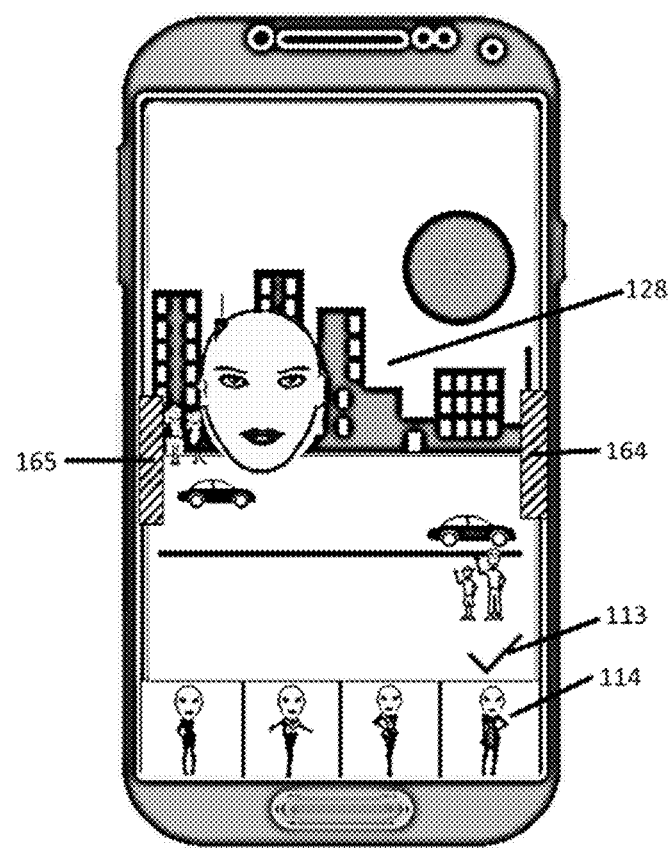
FIG. 32 is a screen capture of one embodiment of the image based social media network application of the method and shows option to edit Feature with avatar selection.

FIG. 32 this embodiment illustrates user options to alter and edit feature 128 with avatar selection 114 or to save and proceed 113 with Feature with no avatar body. User may utilize navigational swipe-right gesture to access profile page 165 or navigational swipe-left gesture to access world portal and buds portal 164.

Figure 33:
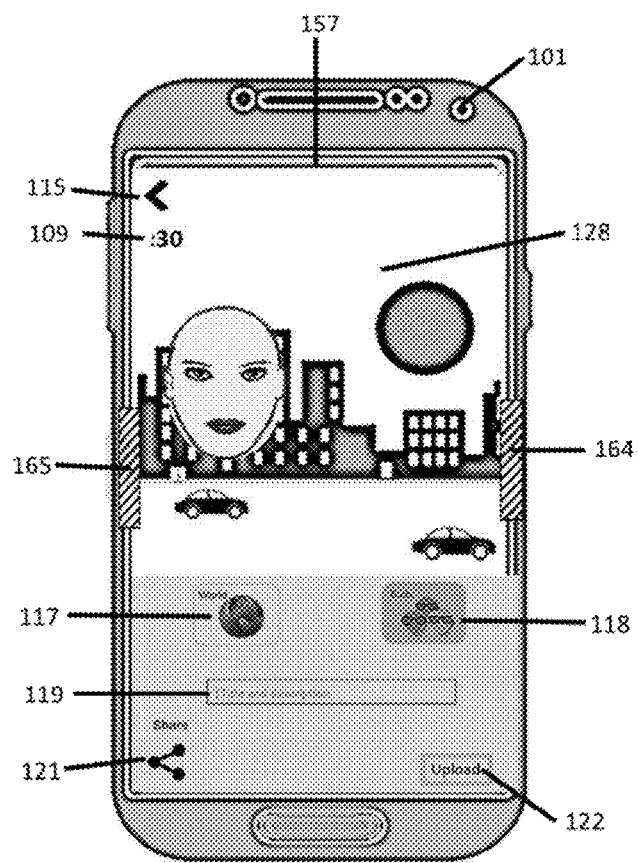
FIG. 33 is a screen capture of one embodiment of the image based social media network application of the method and shows user option for uploading Feature to buds portal.

FIG. 33 this embodiment illustrates user portal options for uploading Feature 128. Portal options are comprised of world portal option 117 which allow user to upload Feature 128 to entire social media application network and buds portal option 118 which allows user to upload Feature 128 to user's contacts only. In this embodiment user has selected buds portal option 118. Timer 109 displays length of Feature. User is required to input title and description 119 for classification and search purposes for uploading Feature 128 only in buds portal. User has the option to share 121 to external networks. User has option to go back 115 to prior screen FIG. 33 or to upload 122 to selected portal and or share Feature 128. User may utilize navigational swipe-right gesture to access profile page 165 or navigational swipe-left gesture to access world portal and buds portal 164.

Figure 34:
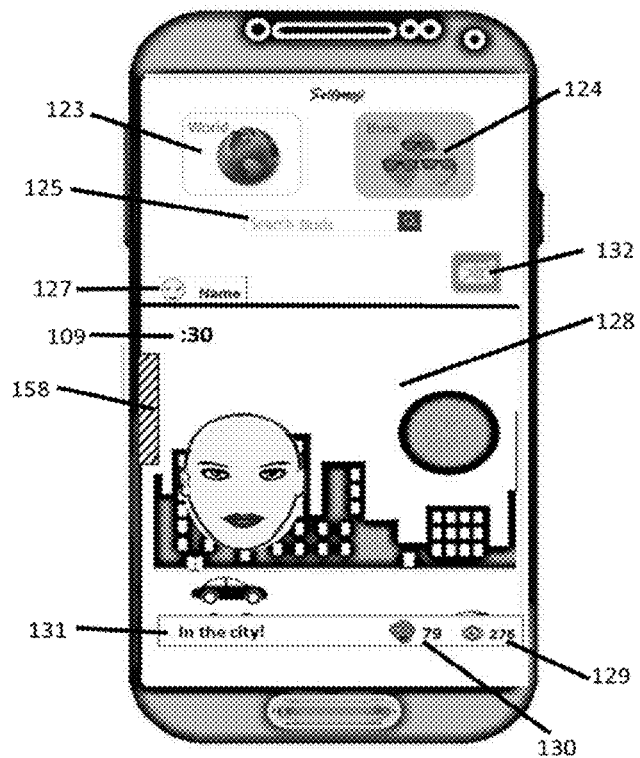
FIG. 34 is a screen capture of one embodiment of the image based social media network application of the method and shows Feature uploaded to buds portal.

FIG. 34 this embodiment illustrates Feature 128 uploaded to buds portal 124 enabling users in the social media application network to interact and engage with established contacts by viewing, searching, and supporting uploaded Features. User options include search 125 enabling users to enter keywords to search for Features 128. All Features uploaded to buds portal 124 provide a profile tab 127 depicting face and system name of user that submitted feature. View count icon 129 provides a metric for the number of times of Feature has been viewed. Support icon 130 further enables users to express support and approval for viewed Features. Feature title and description 131 represents user inputted title and description for Feature and timer 109 represents length of Feature. Private messenger icon 132 provides access to private messenger. This embodiment further illustrates user options to access world portal 123 and access to camera capture 158 via navigational swipe-right gesture.

Figure 35:
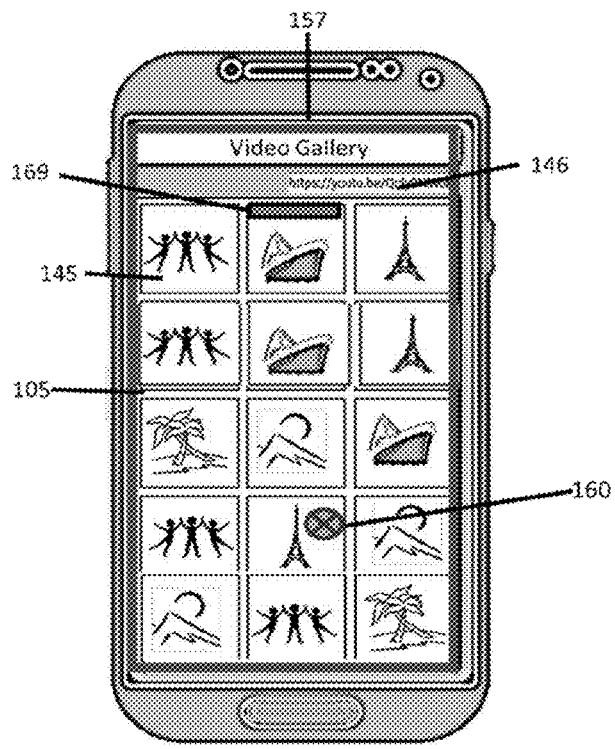
FIG. 35 is a screen capture of one embodiment of the image based social media network application of the method and shows video gallery.

FIG. 35 this embodiment illustrates social media application video gallery 105 comprised of video files 145. User has option to save back-end event only recordings to video gallery 105, and user has option to upload from mobile device's external video gallery to social media application video gallery 105. Additionally user has option to insert video link 146 from the internet to download videos from web to application's video gallery 105. Select 160 enables user to confirm selection video file 145 for back-end event. User has option to exit video gallery 105 and return to camera capture mode 169 via navigational swipe-down gesture.

Figure 36:
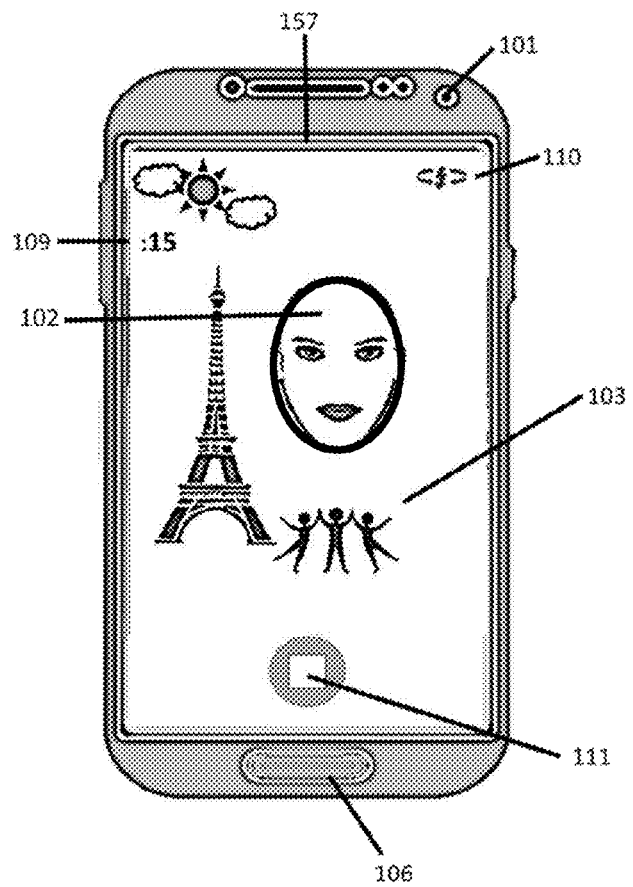
FIG. 36 is a screen capture of one embodiment of the image based social media network application of the method and shows face-only recording overlaid on video file playback selected from video gallery.

FIG. 36 this embodiment illustrates a user in record mode comprised of a face-only 102 recording utilizing front-end camera 101 and microphone 106 for audio input, overlaid on simultaneous playback of video file back-end event 103 selected from video gallery. In record mode user has option to position and size face-only 102 recording in oval frame on simultaneous playback of video file back-end event 103 on screen 157. Timer 109 displays recording progression and front-end light 110 provides lighting for face-only 102 for low-light conditions. User initiates stop record 111 to end recording.

Figure 37:
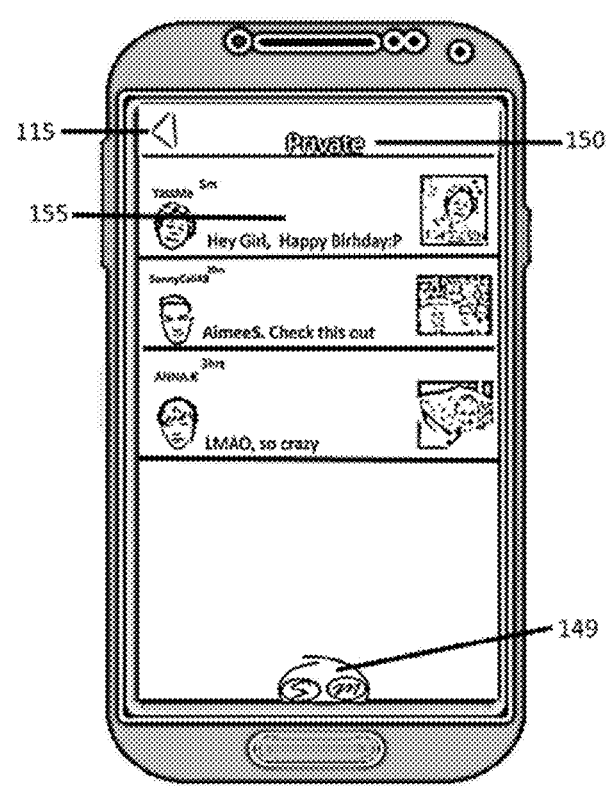
FIG. 37 is a screen capture of one embodiment of the image based social media network application of the method and shows private messaging conversation log.

FIG. 37 this embodiment illustrates private messenger conversation log 150 comprised of private messages sent and received 155 in private messenger between user and user contacts and not uploaded to world portal and buds portal. User has option to initiate camera capture 149 to access camera capture and video gallery in private messenger. User has option to go back 115 to FIG. 35.

Figure 38:
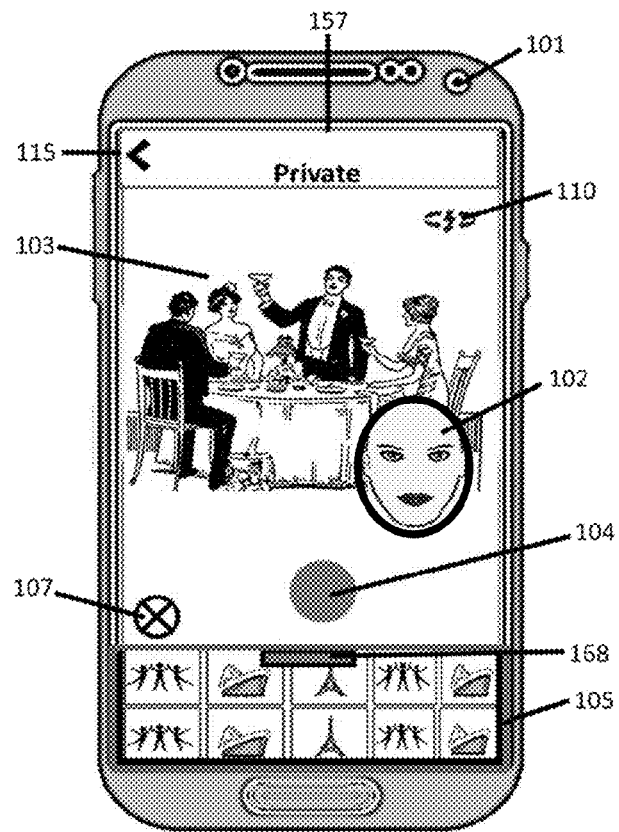
FIG. 38 is a screen capture of one embodiment of the image based social media network application of the method and shows capture mode of two streams in private messenger.

FIG. 38 this embodiment illustrates social media application's simultaneous capture of two video streams, comprised of front-end camera's 101 capture of user's face-only 102 and back-end camera's capture of back-end event 103 in private messenger. In camera capture mode user has option to position and size face-only 102 in oval frame on simultaneous capture of back-end event 103 on screen 157. In this illustration user has option to simultaneously commence record 104 of two video streams. Alternatively, user has option to remove 107 face-only 102 video capture, browse video gallery 105, or initiate front-end light 110. User options to access video gallery 168 via navigational swipe-up gesture and user option to go back 115 to FIG. 37.

Figure 39:
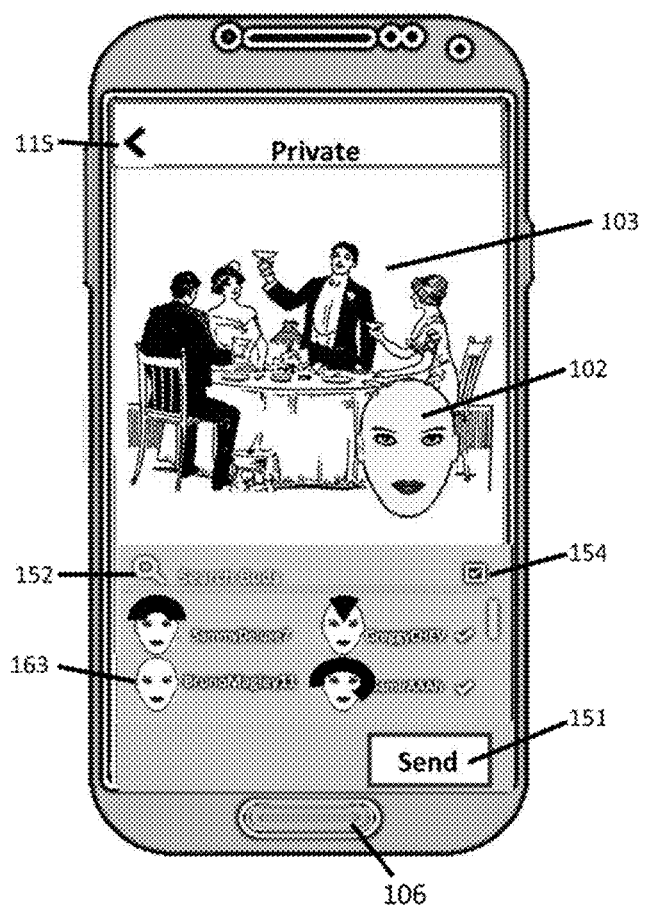
FIG. 39 is a screen capture of one embodiment of the image based social media network application of the method and shows private message Feature and options for selecting recipient(s) for sending.

FIG. 39 this embodiment illustrates a completed Feature recording in private messenger comprised of face-only 102 recording overlaid on back-end event 103 synthesized as one video recording. User has option to input name to search 152 user's buds list 163 to select recipient to send the private message. User also has option select all 154 recipients or select individual recipients in user's buds list 163 to send 151 the private message. User has option to go back 115 to FIG. 37.

What is claimed is:

1. A mobile computer based method and process providing an image-based social media application network comprising:

providing at least one server, a social media application, and at least two users;

wherein social media application is configured to run on a first mobile device and at least one second mobile device;

wherein said social media application is configured to allow at least two users to be socially networked;

prompting said first user to create one, or more, video on said social media application;

wherein said social media application comprises simultaneous capture of two video streams allowing user to record an event and be visually present as an active participate in the video recording;

acquiring first video stream capture with mobile device's front-end video camera;

acquiring second video stream capture with mobile device's back-end video camera;

wherein said social media application's capture of first video stream comprises an image sensor providing data enabling application to execute logical instructions for face-detection, for continual capture of user face-only in multi-positions, resulting in front-end camera capture and recording of user face-only image in an oval frame;

wherein said social media application's first video stream capture is comprised of continual auto-focus of user face-only video contained within oval frame;

wherein said social media application's second video stream capture is comprised of user determined back-end camera capture of event;

wherein said first video stream of face-only video capture in oval frame display is overlaid on said second video stream of event;

positioning and sizing of said face-only video capture in oval frame display is user determined;

video recording of captured first and second stream is simultaneously commenced;

synthesizing said first video stream recording and said second video stream recording, and previewing the synthesized result as one completed video recording, hereafter referred to as Feature;

wherein said social media application comprises avatar selection option;

wherein said avatar selection option allow said first user to alter and edit said Feature with the inclusion of an avatar body;

previewing said Feature with said avatar body selection option;

insert title description and tags for said Feature by said first user for uploading and sharing of said feature via said social media application to said second user;

wherein said social media application comprise an insert title description and tags;

wherein said insert title description and tags allows said user to enter title description and tags for classification of said Feature to be uploaded to the social media application network and or shared via said social media application;

share by said first user at least one said Feature to at least one said second user;

wherein said social media application comprises a share option for said first user to share said Feature;

wherein said share option allow said first user to share said Feature with users in external networks via said social media application;

uploading at least one said Feature to said social media application network;

wherein said social media application comprises upload portal options to world portal and buds portal;

wherein said social media application's said world portal upload option allow said first user to upload said Feature to all users in the social media application network;

wherein said social media application's said buds portal upload option allow said first user to upload said Feature to at least one, or more, said second user from first user's buds list contact base;

wherein said social media application comprise upload functionality to upload said Feature;

wherein said upload functionality allows said first user to upload said Feature to a selected portal within the social media application network;

previewing, full-playback, searching, commenting, supporting, and responding to said Features in said social media application portals;

wherein said social media application portals comprise previews for Features uploaded;

wherein said previews of Features uploaded allow user a brief advance showing of Feature and option to view in full-playback;

wherein said social media application is comprised of full-playback functionality of an entire Feature;

wherein said full-playback functionality allows users to view Features uploaded in social media application in full-screen mode;

providing, by said social media application, a user ability to engage and interact by searching user system name and keywords for Features uploaded;

wherein said social media application portal is comprised of search bar for users to enter keywords and user system names to search and view related Feature submissions;

wherein said social media application portals search bar allows users to view search results;

wherein said social media application comprises commenting, supporting, and responding to said Features uploaded to the said social media application network portals;

wherein said social media application network's world portal allows said users to view, comment, support, and respond to said Features uploaded to all users in said social media application network;

wherein said social media application buds portal allows said first user to view, comment, support and respond to said Features uploaded by at least one second user in said first user's buds list contact base;

wherein said social media application portals allow users to respond to said Features viewed by initiating a new Feature recording.

2. The mobile computer based method and process providing an image-based social media network of claim 1, further comprising:

user profile by each of said users; wherein said social media application profile page is comprised of user system name and face, user's buds contact list, favorite list, and archived Features;

wherein said user system name and face allows said user to be identified within the social media application network;

wherein said user's buds contact list allows said user to view and edit buds contacts;

wherein said user's favorite list allows said user to view and edit favorite list contacts;

wherein said user's archived Features allows said user to view history of all said Features uploaded by said user.

3. The computer based method and process providing an image-based social media network of claim 1, further comprising:

providing, by said social media application, a user ability to engage and interact by reposting Features, sharing Features, selecting favorites, commenting, supporting, view count in said social media application portals;

wherein said social media application reposting allows users to re-upload Features viewed only in world portal to buds portal in the social media application network;

wherein said social media application comprises share option for said user to share said Feature;

wherein said share option allow said user to share said Feature with users in external networks via said social media application;

wherein said social media application comprises favorite option for said viewed Feature;

wherein said favorite option allows user to save favored Feature for later viewing, reposting, and sharing;

wherein said favorite option allows user to save favored user for following viewing, reposting, and sharing a favored user's Features;

wherein said social media application comprises commenting option for said viewed Feature;

wherein said commenting option allows user to input written commentary about said viewed Feature in world portal for all users to view and respond and allows users to input written commentary about said viewed Feature in buds portal for only user's buds contacts to view and respond;

wherein said social media application comprise support icon for said viewed Feature;

wherein said support icon allows users to express support for said viewed Feature and provides a tabulation for the number of times Feature has been supported;

wherein said social media application comprises view count per said viewed Feature;

wherein said view count allow users to view a metric of the number of times said Feature has been viewed by other users.

4. The mobile computer based method and process providing an image-based social media network of claim 1, further comprising:

simultaneous capture and recording of two video streams synthesized as one Feature sent in private messenger within a social media application network;

wherein said social media application allows at least two users to send and receive private Feature messages;

wherein said private messenger allows said user to send Feature to at least one or more said second user(s) from said first user's buds contact list via the social media application network;

viewing and responding to said private Feature message received; wherein said social media application comprises viewing and responding to said private Feature received on said social media application;

wherein said social media application allows users to view and respond to said private Feature message viewed by creating new private Feature.

5. The computer based method and process providing an image-based social media network of claim 1, further comprising:

wherein said first computer and at least one second computer further comprise one or more display screens;
displaying on said one or more display screens said social media application;
wherein said social media application further comprise one or more navigational swipe gestures, icons and navigational buttons that are displayed on said one or more display screens;
wherein said social media application further comprise one or more viewing screens; and
switching between said one or more viewing screens, such that users may access camera capture, video gallery, profile page and access world portal and buds portal;
wherein said navigational swipe gestures, icons, and navigational buttons allow user to navigate through the social media application network.

6. The mobile computer based method and process providing an image-based social media network comprising:
providing at least one server, at least two users, a social media application, and user options to capture and record two streams by overlaying face only recording on simultaneous playback of pre-recorded back-end event only;
wherein social media application is configured to run on a first mobile device and at least one second mobile device;
wherein said social media application is configured to allow at least two users to be socially networked;
prompting said first user to create one, or more, video on said social media application;
wherein said social media application comprise user options for simultaneous capture and recording of first and second stream and a remove face-only capture functionality option allowing user to record back-end event only;
wherein said remove face-only functionality option allows user to remove face-only capture and to record second stream back-end event only with back-end camera;
acquiring back end camera second video stream recording back end event only;
wherein said remove face-only functionality is user initiated allowing user to capture and record of back-end event only utilizing back-end camera;
wherein said record back-end event only functionality allows user to commence and complete a recording of back-end event only with further option to initiate overlay of face-only recording, or option to save back-end event only to video gallery, or option to delete back-end recording and be redirected to simultaneous capture and recording of first and second stream;
acquiring first video stream capture with mobile device's front-end video camera;
wherein said social media application's capture of first video stream comprises an image sensor providing data enabling application to execute logical instructions for face-detection, for continual capture of user face-only in multi-positions, resulting in front-end camera capture and recording of user face-only image in an oval frame;
wherein said front-end video camera's first stream face-only video capture is comprised of continuous auto-face-detection and auto-face-focus in oval frame display;
wherein said social media application comprises functionality enabling user to initiate face-only capture and recording overlaid on pre-recorded back-end event only;
wherein said initiate face-only recording functionality allows user to capture and record first stream face-only video in oval frame utilizing front-end camera overlaid on playback of second stream pre-recorded back-end event only;
positioning and sizing of said face-only video capture and recording in oval frame display is user determined;
video recording of said first stream and simultaneous playback of said second stream is commenced, recording said first video stream of face-only video recording in oval frame display is overlaid on said second video stream playback;
synthesizing said first video stream face-only recording and said second video stream playback of back-end event only and previewing the synthesized result as one completed video recording, hereafter referred to as a Feature;
wherein said social media application comprises avatar selection option;
wherein said avatar selection option allow said first user to alter and edit said Feature with the inclusion of an avatar body;
previewing said Feature with said avatar body selection option;
insert title description and tags for said Feature by said first user for uploading and sharing of said Feature via said social media application to said second user;
wherein said social media application comprise an insert title description and tags;
wherein said insert title description and tags allows said user to enter title description and tags for classification of said Feature to be uploaded and or shared via said social media application;
share by said first user at least one said Feature to at least one said second user;
wherein said social media application comprises a share option for said first user to share said Feature;
wherein said share option allow said first user to share said Feature with users in external networks via said social media application;
uploading at least one said Feature to said social media application network;
wherein said social media application comprises upload portal options to world portal and buds portal;
wherein said social media application's said world portal upload option allow said first user to upload said Feature to all users in the social media application network;
wherein said social media application's said buds portal upload option allow said first user to upload said Feature to at least one, or more, said second user from first user's buds list contact base;
wherein said social media application comprise upload functionality to upload said Feature;
wherein said upload functionality allows said first user to upload said Feature to a selected portal within the social media application network;
previewing, full-playback, searching, commenting, supporting, and responding to said Features in said social media application portals;
wherein said social media application portals comprise previews for Features uploaded;
wherein said previews of Features uploaded allow user a brief advance showing of Feature and option to view in full-playback;
wherein said social media application is comprised of full-playback functionality for a Feature;
wherein said full-playback functionality allows users to view Features uploaded in social media application in full-screen mode;

providing, by said social media application, a user ability to engage and interact by searching user system name and keywords for Features uploaded;

wherein said social media application portal is comprised of a search bar for users to enter keywords and user system names to search and view related Feature submissions;

wherein said social media application portals search bar allows users to view search results;

wherein said social media application comprises commenting, supporting, and responding to said Features uploaded to the said social media application network portals;

wherein said social media application network's world portal allows said users to view, comment, support, and respond to said Features uploaded to all users in said social media application network;

wherein said social media application buds portal allows said first user to view, comment, support and respond to said Features uploaded by at least one second user in said first user's buds list contact base;

wherein said social media application portals allow users to respond to said Features viewed by initiating a new Feature recording.

7. The computer based method and process providing an image-based social media network of claim 6, further comprising:

wherein said first computer and at least one second computer further comprise one or more display screens;

displaying on said one or more display screens said social media application;

wherein said social media application further comprise one or more navigational swipe gestures, icons and navigational buttons that are displayed on said one or more display screens;

wherein said social media application further comprise one or more viewing screens; and switching between said one or more viewing screens, such that users may access camera capture, video gallery, profile page and access world portal and buds portal;

wherein said navigational swipe gestures, icons, and navigational buttons allow user to navigate through the social media application network.

8. The mobile computer based method and process providing an image-based social media network comprising:

providing at least one server, at least two users, a social media application, and user options to capture and record two streams by overlaying face-only recording on simultaneous playback of a video file selected from video gallery;

wherein social media application is configured to run on a first mobile device and at least one second mobile device;

wherein said social media application is configured to allow at least two users to be socially networked;

prompting said first user to create one, or more, video on said social media application;

wherein said social media application is comprised of access to video gallery;

wherein said access to video gallery allows user to select a video file from application video gallery for use as back-end event upon which to overlay first stream face-only recording on selected second stream back-end event;

acquiring second video stream recording from video file selected from video gallery is user initiated;

acquiring first video stream capture with mobile device's front-end video camera;

wherein said social media application's capture of first video stream comprises an image sensor providing data enabling application to execute logical instructions for face-detection, for continual capture of user face-only in multi-positions, resulting in front-end camera capture and recording of user face-only image in an oval frame;

wherein said social media application comprises functionality enabling user to capture and record face-only video in oval frame utilizing front-end camera overlaid on playback of video file selected from video gallery;

positioning and sizing of said face-only video capture in oval frame display is user determined;

video recording of said first stream and simultaneous playback of said second stream is commenced allowing user to record face-only video overlaid on playback of video file selected from video gallery;

synthesizing said first video stream face-only recording and said second video stream playback of video file and previewing the synthesized result as one completed video recording, hereafter referred to as a Feature;

wherein said social media application comprises avatar selection option;

wherein said avatar selection option allow said first user to alter and edit said Feature with the inclusion of an avatar body;

previewing said Feature with said avatar body selection option;

insert title description and tags for said Feature by said first user for uploading and sharing of said Feature via said social media application to said second user;

wherein said social media application comprise an insert title description and tags;

wherein said insert title description and tags allows said user to enter title description and tags for classification of said Feature to be uploaded and or shared via said social media application;

share by said first user at least one said Feature to at least one said second user;

wherein said social media application comprises a share option for said first user to share said Feature;

wherein said share option allow said first user to share said Feature with users in external networks via said social media application;

uploading at least one said Feature to said social media application network;

wherein said social media application comprises upload portal options to world portal and buds portal;

wherein said social media application's said world portal upload option allow said first user to upload said Feature to all users in the social media application network;

wherein said social media application's said buds portal upload option allow said first user to upload said Feature to at least one, or more, said second user from first user's buds contact list;

wherein said social media application comprise upload functionality to upload said Feature;

wherein said upload functionality allows said first user to upload said Feature to said user selected portal option within the social media application network;

previewing, full-playback, searching, commenting, supporting, and responding to said Features in said social media application portals;

wherein said social media application portals comprise previews for Features uploaded;

wherein said previews of Features uploaded allow user a brief advance showing of Feature and option to view in full-playback;

wherein said social media application is comprised of full-playback functionality of an entire Feature;

wherein said full-playback functionality allow users to view Features uploaded in social media application in full-screen mode;

providing, by said social media application, a user ability to engage and interact by searching user system name and keywords for Features uploaded;

wherein said social media application portal is comprised of search bar for users to enter keywords and user system names to search and view related Feature submissions;

wherein said social media application portals search bar allows users to view search results;

wherein said social media application comprises commenting, supporting, and responding to said Features uploaded to the said social media application network portals;

wherein said social media application network's world portal allows said users to view, comment, support, and respond to said Features uploaded to all users in said social media application network;

wherein said social media application buds portal allows said first user to view, comment, support and respond to said Features uploaded by at least one second user in said first user's buds contact list;

wherein said social media application portals allow users to respond to said Features viewed by initiating a new Feature recording.

9. The mobile computer based method and process providing an image-based social media network of claim 8, further comprising:

social media application functionality option enabling user to source a video web file(s) from the internet, save to video gallery for use as back-end event, upon which to overlay face-only recording;

wherein said social media application comprises an insert video web link enabling user to paste video web links from the internet onto application's text field;

wherein said insert video web link allows user to download said web videos to said application video gallery for use as second video stream back-end event upon which to overlay face-only recording;

video recording of said first stream and simultaneous playback of said second stream is commenced allowing user to record face-only video overlaid on playback of video web file selected from video gallery;

synthesizing said first video stream face-only recording and said second video stream playback of video web file and previewing the synthesized result as one completed video recording, hereafter referred to as a Feature.

10. The computer based method and process providing an image-based social media network of claim 8, further comprising:

wherein said first computer and at least one second computer further comprise one or more display screens;

displaying on said one or more display screens said social media application;

wherein said social media application further comprise one or more navigational swipe gestures, icons and navigational buttons that are displayed on said one or more display screens;

wherein said social media application further comprise one or more viewing screens; and switching between said one or more viewing screens, such that users may access camera capture, video gallery, profile page and access world portal and buds portal;

wherein said navigational swipe gestures, icons, and navigational buttons allow user to navigate through the social media application network.

* * * * *